United States Patent
Negishi

(10) Patent No.: US 10,239,206 B2
(45) Date of Patent: Mar. 26, 2019

(54) ROBOT CONTROLLING METHOD, ROBOT APPARATUS, PROGRAM AND RECORDING MEDIUM

(71) Applicant: CANON KABUSHIKI KAISHA, Tokyo (JP)

(72) Inventor: Mahito Negishi, Tachikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 15/078,380

(22) Filed: Mar. 23, 2016

(65) Prior Publication Data
US 2016/0297069 A1 Oct. 13, 2016

(30) Foreign Application Priority Data
Apr. 7, 2015 (JP) .................................. 2015-078716

(51) Int. Cl.
*B25J 9/16* (2006.01)

(52) U.S. Cl.
CPC ........... *B25J 9/1638* (2013.01); *B25J 9/1692* (2013.01); *G05B 2219/37431* (2013.01);
(Continued)

(58) Field of Classification Search
CPC ................. B25J 9/1638; B25J 9/1692; G05B 2219/37431; G05B 2219/39206;
(Continued)

(56) References Cited

U.S. PATENT DOCUMENTS 4,710,884 A * 12/1987 Tokairin ................. B25J 9/1638
                                                            700/254
4,887,222 A * 12/1989 Miyake .................. G05B 19/41
                                                            700/262
(Continued)

FOREIGN PATENT DOCUMENTS

EP     2 835 228 A2    2/2015
JP     3808321 B2      8/2006

OTHER PUBLICATIONS

European Search Report dated Sep. 12, 2016 in European Application No. 16162751.8.

*Primary Examiner* — Stephen Holwerda
(74) *Attorney, Agent, or Firm* — Venable, LLP

(57) ABSTRACT

A controlling unit obtains an error in position and orientation of each joint of a robot. The controlling unit uses an error component in a driving direction of an actuator included in the error in position and orientation $u_i$ of the joint to obtain a first correction quantity, to obtain a residual error excluding the error component in the driving direction of the actuator from the error in position and orientation of the joint, and to obtain—an error in position and orientation of the end point of the robot based on the residual error of each joint. The controlling unit uses the error in position and orientation of the joint based on the error in position and orientation of the end point of the robot to obtain a second correction quantity $\Delta q_i$, and uses the first correction quantity and the second correction quantity to correct a joint instruction value.

11 Claims, 18 Drawing Sheets

(52) U.S. Cl.
CPC .............. *G05B 2219/39176* (2013.01); *G05B 2219/39191* (2013.01); *G05B 2219/39192* (2013.01); *G05B 2219/39206* (2013.01)

(58) Field of Classification Search
CPC ........... G05B 2219/39191; G05B 2219/39192; G05B 2219/39176
See application file for complete search history.

(56) References Cited

U.S. PATENT DOCUMENTS

| | | | | |
|---|---|---|---|---|
| 4,893,254 A * | 1/1990 | Chan | ...................... | B25J 9/1607 700/263 |
| 5,055,755 A * | 10/1991 | Ozawa | .................... | B25J 9/161 318/568.1 |
| 5,418,441 A * | 5/1995 | Furukawa | .............. | B25J 9/1641 318/568.22 |
| 5,555,347 A * | 9/1996 | Yoneda | .................. | B25J 9/1607 700/247 |
| 6,690,999 B2 * | 2/2004 | Kimura | .................. | B25J 9/1605 318/568.1 |
| 6,826,450 B2 * | 11/2004 | Watanabe | .............. | B25J 9/1638 219/124.34 |
| 7,130,718 B2 * | 10/2006 | Gunnarsson | ........... | B25J 9/1638 700/254 |
| 7,591,171 B2 | 9/2009 | Negishi | | |
| 7,915,787 B2 | 3/2011 | Negishi et al. | | |
| 8,041,447 B2 * | 10/2011 | Otsuki | ............... | G05B 19/4086 318/568.15 |
| 8,245,317 B2 | 8/2012 | Negishi | | |
| 8,447,561 B2 | 5/2013 | Negishi | | |
| 8,523,765 B2 * | 9/2013 | Kawai | .................. | A61B 1/0055 600/141 |
| 8,744,625 B2 | 6/2014 | Negishi | | |
| 9,221,174 B2 | 12/2015 | Negishi | | |
| 2008/0039973 A1 | 2/2008 | Ueno et al. | | |
| 2015/0045954 A1 | 2/2015 | Negishi | | |
| 2015/0051735 A1 * | 2/2015 | Tanaka | .................. | B25J 9/1638 700/262 |

* cited by examiner

| FIG. 12A |
| FIG. 12B |

ROBOT CONTROLLING METHOD, ROBOT APPARATUS, PROGRAM AND RECORDING MEDIUM

BACKGROUND OF THE INVENTION

Field of the Invention

The present invention relates to a robot controlling method, a robot apparatus, a program and a recording medium for controlling operation of each joint of a robot according to each joint instruction value.

Description of the Related Art

In recent years, robot apparatuses engaged in production, such as assembly, are developed in many cases. An ultimate object of the robot apparatus is to realize complicated and fast assembly work, like that of a hand of a human, in a robot. The robot is controlled according to an instruction trajectory, that is, a joint instruction value of each joint (joint instruction value indicating an angle in a case of a rotary joint, joint instruction value indicating a length in a case of a linear motion joint). However, there is a difference (trajectory error) between the instruction trajectory of the robot and an actual trajectory of the robot. The trajectory error is an obstacle in precise work by the robot. For example, the error needs to be equal to or smaller than 0.1 millimeter in the assembly of a precise component.

Consequently, a technique is proposed, in which a deflection in a multi-joint robot is corrected to improve accuracy of position and orientation, thereby allowing highly accurate operation (Japanese Patent No. 3808321).

In the conventional technique, an error of a robot end due to the deflection of each joint is calculated, and a correction quantity of each joint instruction value for correcting the error is calculated. In general, the multi-joint robot has a cantilever structure with a low stiffness, and the deflection is large. The error in position and orientation of each joint includes an error in a driving direction of the joint as well as errors in other directions. The error of the robot end is several millimeters due to the effect of the error in position and orientation of each joint. In a large arm with a full length of more than 1 [m], the error may exceed 10 millimeters. Inverse mechanism calculation (inverse kinetics calculation) is generally used to calculate the correction quantity of the joint instruction value of each joint based on the error of the robot end. In the inverse mechanism calculation, a case without an error in position and orientation of the joint, such as deflection of the joint, is simulated, and a formula is used to derive a solution. Therefore, the correction quantity for correcting the joint instruction value of each joint calculated by the inverse mechanism calculation always includes a calculation error. When the error of the robot end is large, a correction error of the correction quantity that occurs at the correction of the error is also large.

Therefore, the correction quantity of the joint instruction value of each joint cannot be obtained with a sufficient accuracy by one calculation in the conventional technique. As a result, convergent calculation, that is, loop calculation, is necessary. However, the correction calculation needs to be performed during the operation of the robot. For example, when a time interval of outputting the joint instruction value of each joint is 2 [ms], the convergent calculation needs to be performed within a short time of 2 [ms]. If restrictions of convergence determination are eased to reduce the calculation time required for the convergent calculation, the correction error increases, and highly accurate correction is difficult.

SUMMARY OF THE INVENTION

An object of the present invention is to reduce an amount of calculation and to reduce an error in position and orientation of a robot end.

According to an aspect of the present invention, a robot controlling method in which a controlling unit performs control for causing an actuator of each joint of a multi-joint robot to operate according to each joint instruction value, the robot controlling method comprises: calculating, by the controlling unit, an error in position and orientation of each joint of the robot, for each of the joints; calculating, by the controlling unit, a first correction quantity for correcting the joint instruction value using an error component in a driving direction of the actuator included in the error in position and orientation of the joint obtained in the calculating the error in position and orientation of each joint, for each of the joints; calculating, by the controlling unit, a residual error excluding the error component in the driving direction of the actuator from the error in position and orientation of the joint obtained in the calculating the error in position and orientation of each joint, for each of the joints; calculating, by the controlling unit, an error in position and orientation of an end point of the robot based on the residual error of each of the joints obtained in the calculating the residual error; calculating, by the controlling unit, a second correction quantity for correcting the joint instruction value by using the error in position and orientation of the joint based on the error in position and orientation of the end point of the robot obtained in the calculating the error in position and orientation of the end point, for each of the joints; and correcting, by the controlling unit, the joint instruction value by using the first correction quantity and the second correction quantity, for each of the joints.

The first correction quantity for correcting the joint instruction value of each joint can be directly obtained by using the error component in the driving direction of the actuator of each joint, and the correction error included in the first correction quantity can be reduced. The residual error excluding the error component in the driving direction of the actuator included in the error in position and orientation of each joint is smaller than the error component in the driving direction of the actuator, and the second correction quantity obtained from the error in position and orientation of the end point of the robot based on the residual error of each joint is smaller than the first correction quantity. Therefore, even if the second correction quantity includes the correction error when the second correction quantity of each joint is obtained from the error in position and orientation of the end point of the robot, the second correction quantity is small, and the correction error included in the second correction quantity is also small. Therefore, both of the first correction quantity and the second correction quantity have small correction errors. As a result, the convergent calculation does not have to be performed, and the amount of calculation, that is, calculation time, required for the calculation of the correction quantity can also be reduced. Since the first correction quantity and the second correction quantity with small correction errors are used to correct the joint instruction value, the error in position and orientation of the end point of the robot is reduced, and highly accurate operation of the robot is possible.

Further features of the present invention will become apparent from the following description of exemplary embodiments with reference to the attached drawings.

DESCRIPTION OF THE EMBODIMENTS

Figure 1:
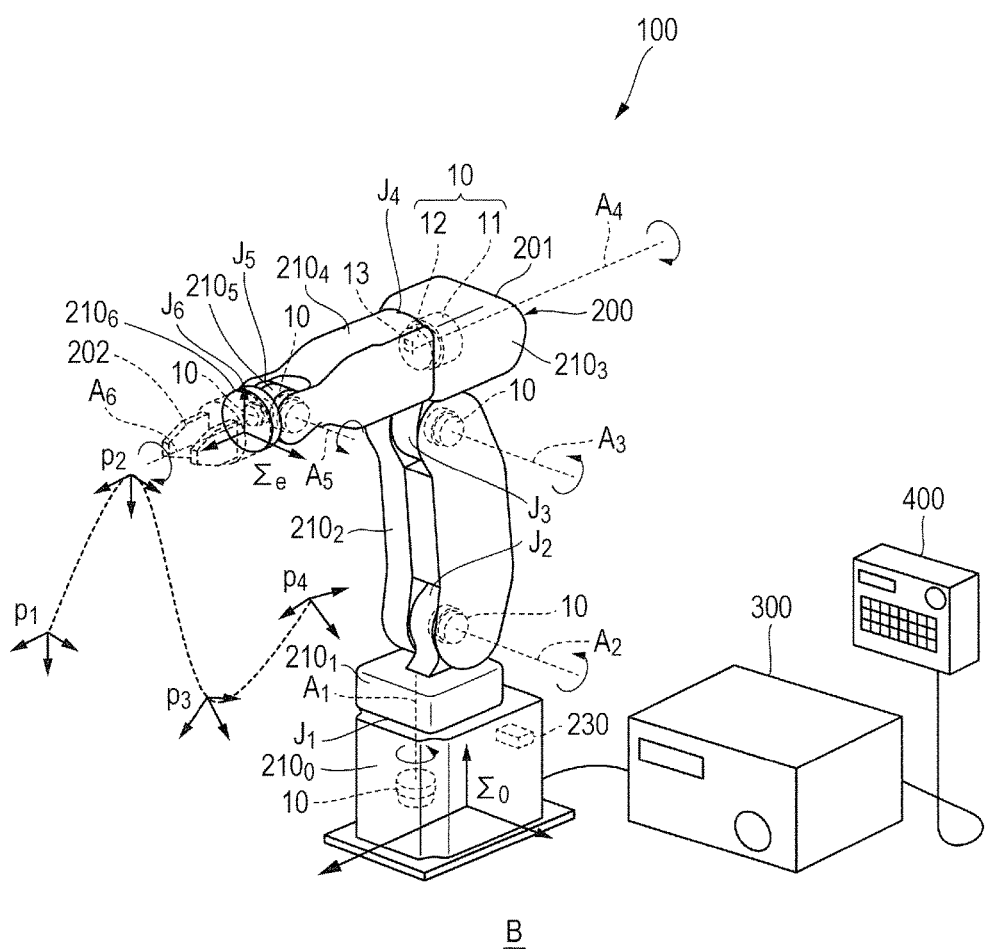
FIG. 1 is a perspective view illustrating a schematic configuration of a robot apparatus according to a first embodiment.

Embodiments for carrying out the present invention will now be described in detail with reference to the drawings. Here, a joint denotes one of a rotary joint and a linear motion joint with one degree of freedom. A joint instruction value is an instruction value of an angle for the rotary joint and is an instruction value of a length for the linear motion joint. Although operations of the two types of joints are different, the operations can be expressed in formulas without distinguishing the joints. Therefore, although the rotary joint will be mainly described below, the same applies to the linear motion joint.

Symbols used in the formulas in the following embodiments will be illustrated first. A formula for transforming a six-dimensional vector v, which includes parallel translation in three directions and rotational transfer expressed by three Euler angles, into a 4×4 homogeneous coordinate transformation matrix T is written as follows.

$$T = \text{CoordTrans}(v) \tag{1}$$

The formula will be expressed more specifically. The following formula can be obtained, wherein $\cos(v_3)$ is abbreviated as $C_3$, $\sin(v_3)$ is abbreviated as $S_3$, and so forth.

$$T = \begin{bmatrix} C_5C_6 & S_4S_5C_6 - C_4S_6 & C_4S_5C_6 + S_4S_6 & v_1 \\ C_5S_6 & S_4S_5S_6 + C_4C_6 & C_4S_5S_6 - S_4C_6 & v_2 \\ -S_5 & S_4C_5 & C_4C_5 & v_3 \\ 0 & 0 & 0 & 1 \end{bmatrix} \tag{2}$$

An inverse transformation of the formula is written as follows.

$$v = \text{CoordTrans}^{-1}(T) \tag{3}$$

The following is a list of main symbols and terms used in formulas in the following embodiments.

$q_j$: Amount of operation of each joint.
  j denotes joint numbers that are integers from 1 to 6 in case of six-joint robot.
  Rotation angle in case of rotary joint.
  Movement distance in case of linear motion joint.

$\Sigma_j$: Coordinates fixed to each joint.
  j denotes joint numbers, and j=0 denotes global coordinates.
  j=e denotes coordinates fixed to end point of robot.
  Examples:
  $\Sigma_0$: Global coordinates
  $\Sigma_2$: Coordinates fixed to second joint
  $\Sigma_e$: Coordinates fixed to end point of robot ${}^iT_j$ Coordinate transformation matrix from i-th coordinates $\Sigma_i$ to j-th coordinates $\Sigma_j$.
  Examples
  ${}^1T_2$: Coordinate transformation matrix from coordinates of first joint to coordinates of second joint.
  ${}^0T_e$: Coordinate transformation matrix from global coordinates to coordinates of robot end.

$Tr_j$: Coordinate transformation matrix indicating position and orientation of fixed end of j-th joint.
  : Indicating mount position of joint.

$\Delta Tr_j$: Coordinate transformation matrix indicating error of $Tr_j$.

$r_j$: Vector expressing $\Delta Tr_j$ by parallel translation components and Euler angle components.
  : More specifically, $r_j = \text{CoordTrans}^{-1}(\Delta Tr_j)$ $Tv_j(q_j)$: Coordinate transformation matrix indicating position and orientation of moving end of j-th joint.
  : Rotation matrix of angle $q_i$ in case of rotary joint.

$\Delta Tv_j$: Coordinate transformation matrix indicating error of $Tv_j(q_j)$.

$v_j$: Vector expressing $\Delta Tv_j$ by parallel translation components and Euler angle components
  : More specifically, $v_j = \text{CoordTrans}^{-1}(\Delta Tv_j)$ $\Delta Tu_j$: Coordinate transformation matrix integrating two types of errors $\Delta Tr_j$ and $\Delta Tv_j$.

$w_i$: Force and moment exerted on joint.
  : Vector with six elements of force and moment which is also called wrench.

J: Jacobian matrix for position and orientation of robot end.
D: Value of determinant of Jacobian matrix.

First Embodiment

FIG. 1 is a perspective view illustrating a schematic configuration of a robot apparatus according to a first embodiment of the present invention. As illustrated in FIG. 1, a robot apparatus 100 includes a multi-joint robot 200 and a robot controlling apparatus 300 as a controlling unit that controls operation of the robot 200. The robot apparatus 100 also includes a teaching pendant 400 as a teaching apparatus that transmits data of a plurality of teaching points to the robot controlling apparatus 300. The teaching pendant 400 is operated by a person and is used for designating operation of the robot 200 and the robot controlling apparatus 300.

The robot 200 is a vertical multi-joint robot. More specifically, the robot 200 includes a vertical multi-joint robot arm 201 and a robot hand 202 as an end effector mounted on an end point of the robot arm 201. Although the end effector is the robot hand 202 in the following description, the end effector is not limited to this, and the end effector may be a tool.

A base end of the robot arm 201 is a fixed end fixed to a base B. The end point of the robot arm 201 is a free end. In the first embodiment, an end point of the robot 200 is the end point of the robot arm 201, that is, the robot hand 202.

The robot 200, that is, the robot arm 201, includes a plurality of joints, such as six joints (six axes) $J_1$ to $J_6$. The robot arm 201 includes a plurality of (six) actuators 10 that rotate and drive the joints $J_1$ to $J_6$ around joint axes $A_1$ to $A_6$, respectively.

The robot arm 201 includes a plurality of links (frames) $210_0$ to $210_6$ rotatably connected at the joints $J_1$ to $J_6$ Here, the links $210_0$ to $210_6$ are sequentially connected in series from the base end to the front end. The robot arm 201 can direct the end point of the robot 200 (fingers of the robot 200), that is, the robot hand 202, to an arbitrary three-dimensional position and an arbitrary orientation in three directions within a movable range.

The position and orientation of the robot arm 201 can be expressed by coordinates. Coordinates $\Sigma_0$ denote coordinates fixed to the base end of the robot arm 201, that is, the base B, and coordinates $\Sigma_e$ denote coordinates fixed to the end point of the robot arm 201.

The actuators 10 provided at the joints $J_1$ to $J_6$ drive the joints $J_1$ to $J_6$. More specifically, each actuator 10 drives one link $210_i$ of a pair of links $210_{i-1}$ and $210_i$ connected at the joint $J_i$ relative to the other link $210_{i-1}$. Here, i is 1 to 6 in the 6-axis robot 200. Coordinates $\Sigma_i$ are fixed to the joint $J_i$ (moving end that moves relative to the fixed end). Here, the fixed end of the joint $J_i$ is the link $210_{i-1}$, and the moving end of the joint $J_i$ is the link $210_i$.

Therefore, one end of the link $210_i$ is the moving end of the joint $J_{i-1}$, and the other end of the link $210_i$ is the fixed end of the joint $J_i$ (wherein i=2 to 5). As for the link $210_0$, one end of the link $210_0$ is fixed to the base B, and the other end of the link $210_0$ is the fixed end of the joint $J_i$. As for the link $210_6$, one end of the link $210_6$ is the moving end. The robot hand 202 is mounted on the other end of the link $210_6$. The global coordinates $\Sigma_0$ are provided at one end of the link $210_0$.

Each actuator 10 includes an electric motor 11 and a reduction gear 12 connected to the electric motor 11. The reduction gears 12 are directly connected to the links relatively driven at the joints $J_1$ to $J_6$, or connected through transmission members, such as belts, bearings and gears, not illustrated.

A joint angle detection unit 13, such as an encoder, is arranged on each reduction gear 12, and angles of the joints $J_1$ to $J_6$ can be detected. As a result of the detection of the angles of the joints $J_1$ to $J_6$, the robot controlling apparatus 300 can calculate the position and orientation of the end point of the robot 200 and can obtain an actual trajectory of the robot arm 201.

The configuration of the actuators 10 is not limited to this, and for example, artificial muscles may be used.

A servo-controlling apparatus 230 as a drive controlling unit that drives the electric motors 11 of the actuators 10 is arranged inside of the robot arm 201.

The servo-controlling apparatus 230 controls operation of the electric motors 11 by outputting current to the electric motors 11 so that the joint positions of the joints $J_1$ to $J_6$ follow instruction trajectories. Since the joints $J_1$ to $J_6$ are rotary joints in the first embodiment, the joint positions are joint angles. The instruction trajectories are joint instruction values of the joints $J_1$ to $J_6$ and are angle instruction values in the first embodiment because the joints $J_1$ to $J_6$ are rotary joints.

The servo-controlling apparatus 230 is formed by one controlling apparatus in the description, that is, the servo-controlling apparatus 230 comprehensively drives and controls the plurality of electric motors 11. However, joint controlling units corresponding to the electric motors 11 may drive and control the electric motors 11.

FIG. 1 illustrates four teaching points $p_1$, $p_2$, $p_3$ and $p_4$. A person uses the teaching pendant 400 to provide the teaching points to the robot controlling apparatus 300, for example. Here, the teaching points $p_1$, $p_2$, $p_3$ and $p_4$ are not points in a so-called three-dimensional space.

Parameters indicating a degree of freedom of the robot arm 201 (robot 200) are set as joint angles, and the joint angles of six joints $J_1$ to $J_6$ of the robot arm 201 are indicated by $\theta_1$ to $\theta_6$, respectively. The configuration of the robot arm 201 is indicated by ($\theta_1$, $\theta_2$, $\theta_3$, $\theta_4$, $\theta_5$, $\theta_6$) which can be assumed as one point on a joint space. In this way, when the parameters indicating the degree of freedom of the robot arm 201 are set as values of coordinate axes, the configuration of the robot arm 201 can be expressed as a point on the joint space. Therefore, the joint space is a space in which the joint angles of the robot arm 201 (robot 200) are coordinate axes.

A tool center point (TCP) is set at the end point of the robot 200, that is, the robot hand 202. The TCP is expressed by three parameters (x, y, z) indicating the position and three parameters ($\alpha$, $\beta$, $\gamma$) indicating the orientation (rotation), that is, six parameters (x, y, z, $\alpha$, $\beta$, $\gamma$), and the TCP can be assumed as one point on a task space. Therefore, the task space is a space defined by these six coordinate axes.

When the robot 200 is moved in the joint space, the teaching points are joint angles. In the task space movement, the teaching points are positions and orientations in the three-dimensional space, and $p_1$, $p_2$, $p_3$ and $p_4$ are expressed by coordinates as in FIG. 1. Therefore, the teaching points are not points in the so-called three-dimensional space, but the teaching points can be understood as one vector.

The robot controlling apparatus 300 is formed by a computer. The robot controlling apparatus 300 generates a trajectory connecting the teaching points, that is, a trajectory interpolating the teaching points.

More specifically, the robot controlling apparatus 300 generates a path (interpolation path) of the robot 200 interpolating the teaching points. The path of the robot 200 is a track of the configuration of the robot 200 in the joint space or a track of the TCP of the robot 200 in the task space. In other words, the path of the robot 200 is an ordered set of points in the joint space or the task space. The trajectory of the robot 200 indicates a path with the time as a parameter and is a set of joint instruction values (angle instruction values) of the joints $J_1$ to $J_6$ of the robot 200 at each time. Since the robot 200 includes a plurality of joints, the joint instruction values are synchronized for the joints $J_1$ to $J_6$. Examples of an interpolating method for interpolating the teaching points include Spline interpolation, B-Spline interpolation, Bezier curve, linear interpolation, circular interpolation and joint interpolation.

The target in the first embodiment is a trajectory initially set by using the teaching points taught by the teaching pendant 400 or the like. Therefore, the trajectory in the task space will be called a target trajectory x (illustrated by a dotted line in FIG. 1), and the trajectory in the joint space provided to the servo-controlling apparatus 230 will be called an instruction trajectory u.

The trajectories are time-series data including $T_{total}/\Delta t$ elements, wherein $T_{total}$ is time from the start to the stop of operation, and $\Delta t$ is a certain time interval (for example, 2 [ms]). Particularly, the instruction trajectory u is time-series data (joint instruction values) including $T_{total}/\Delta t$ elements for the joints $J_1$ to $J_6$. Since the teaching points indicate a vector, the target trajectory x and the instruction trajectory u are time-series data of the vector, that is, two-dimensional array data.

The servo-controlling apparatus 230 provided with the instruction trajectory u from the robot controlling apparatus 300 drives and controls the robot 200, that is, the angles of the joints of the robot arm 201. The servo-controlling apparatus 230 receives the instruction trajectory u to operate the robot arm 201 and outputs an actual trajectory y that is an operation result. The actual trajectory y is time-series data of the same vector as the target trajectory x, that is, two-dimensional array data. The target trajectory x may be provided to the joints based on joint angles or may be provided to the joints based on coordinate values of orthogonal coordinates. Hereinafter, the instruction values (joint instruction values) of the joint angles output to the joints $J_1$ to $J_6$ of the instruction trajectory u will be written as $q_1$ to $q_6$.

Figure 2:
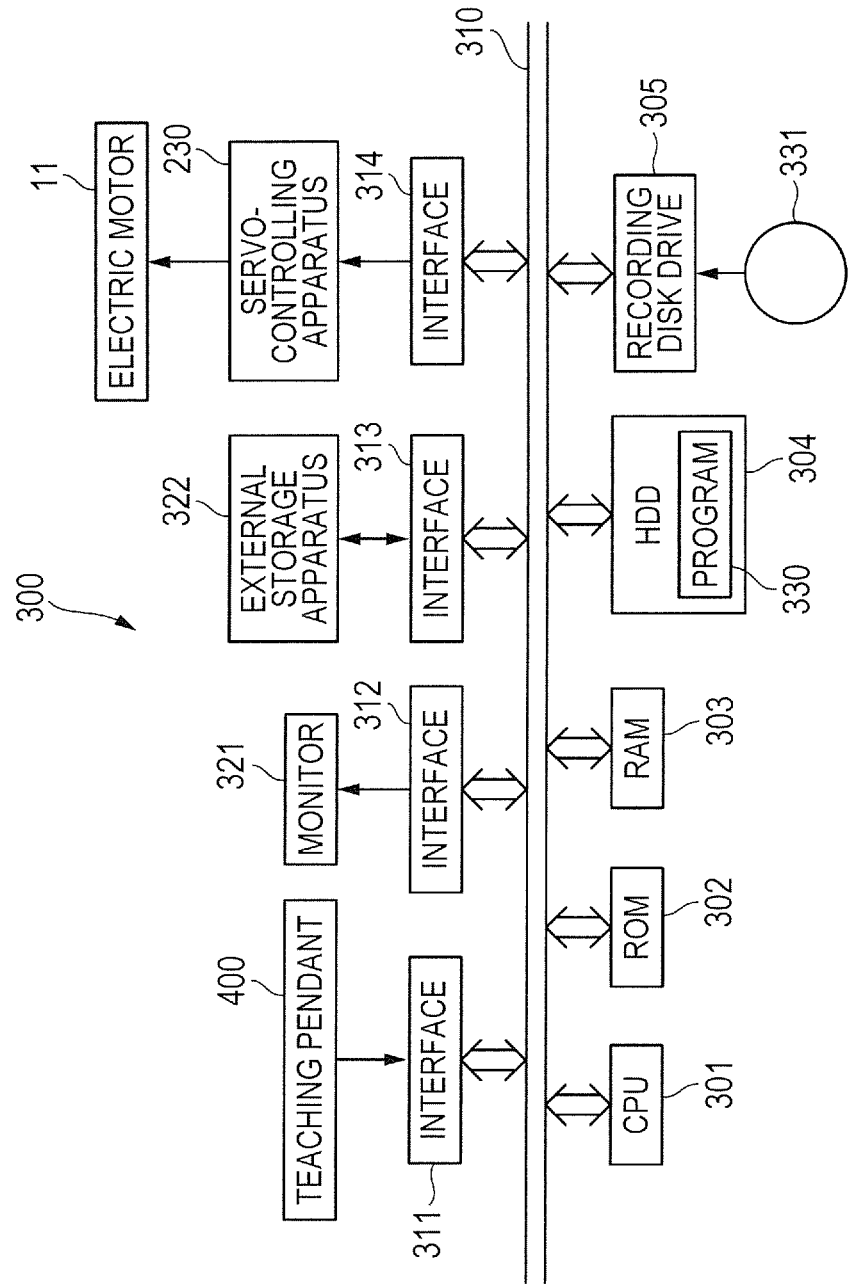
FIG. 2 is a block diagram illustrating a robot controlling apparatus of the robot apparatus according to the first embodiment.

Next, the robot controlling apparatus 300 will be described. FIG. 2 is a block diagram illustrating the robot controlling apparatus of the robot apparatus according to the first embodiment of the present invention. The robot controlling apparatus 300 is formed by a computer and includes a CPU (Central Processing Unit) 301 as a controlling unit. The robot controlling apparatus 300 also includes a ROM (Read Only Memory) 302, a RAM (Random Access Memory) 303 and an HDD (Hard Disk Drive) 304 as storage units. The robot controlling apparatus 300 also includes a recording disk drive 305 and various interfaces 311 to 314.

The ROM 302, the RAM 303, the HDD 304, the recording disk drive 305, and the various interfaces 311 to 314 are connected to the CPU 301 through a bus 310. A basic program, such as BIOS, is stored in the ROM 302. The RAM 303 is a storage apparatus that temporarily stores various data, such as arithmetic processing results of the CPU 301.

The HDD 304 is a storage apparatus that stores arithmetic processing results of the CPU 301 and various data acquired from the outside (including best instruction trajectory and best evaluation value), and the HDD 304 also records a program 330 for causing the CPU 301 to execute arithmetic processing described later. The program 330 includes a robot controlling program and is a program for causing the CPU 301 to execute various arithmetic processes. The CPU 301 executes each step of the robot controlling method based on the program 330 recorded (stored) in the HDD 304.

The recording disk drive 305 can read various data and programs recorded in a recording disk 331.

The teaching pendant 400 is connected to the interface 311, and the CPU 301 receives input of the data of the teaching points from the teaching pendant 400 through the interface 311 and the bus 310.

The servo-controlling apparatus 230 is connected to the interface 314, and the CPU 301 outputs the data of the instruction trajectories (joint instruction values) to the servo-controlling apparatus 230 at predetermined time intervals through the bus 310 and the interface 314.

A monitor 321 is connected to the interface 312, and various images are displayed on the monitor 321 under the control by the CPU 301. An external storage apparatus 322, such as a rewritable non-volatile memory and an external HDD, can be connected to the interface 313.

Although a computer-readable recording medium is the HDD 304, and the program 330 is stored in the HDD 304 in the description of the first embodiment, the arrangement is not limited to this. The program 330 may be recorded in any recording medium as long as the recording medium is computer-readable. For example, the recording disk 331 or the external storage apparatus 322 illustrated in FIG. 2 may be used as a recording medium for supplying the program 330. Specific examples of the recording medium that can be used include a flexible disk, a hard disk, an optical disk, a magneto-optical disk, a CD-ROM, a CD-R, a magnetic tape, a non-volatile memory and a ROM.

Figures 3, 3A, 3B:
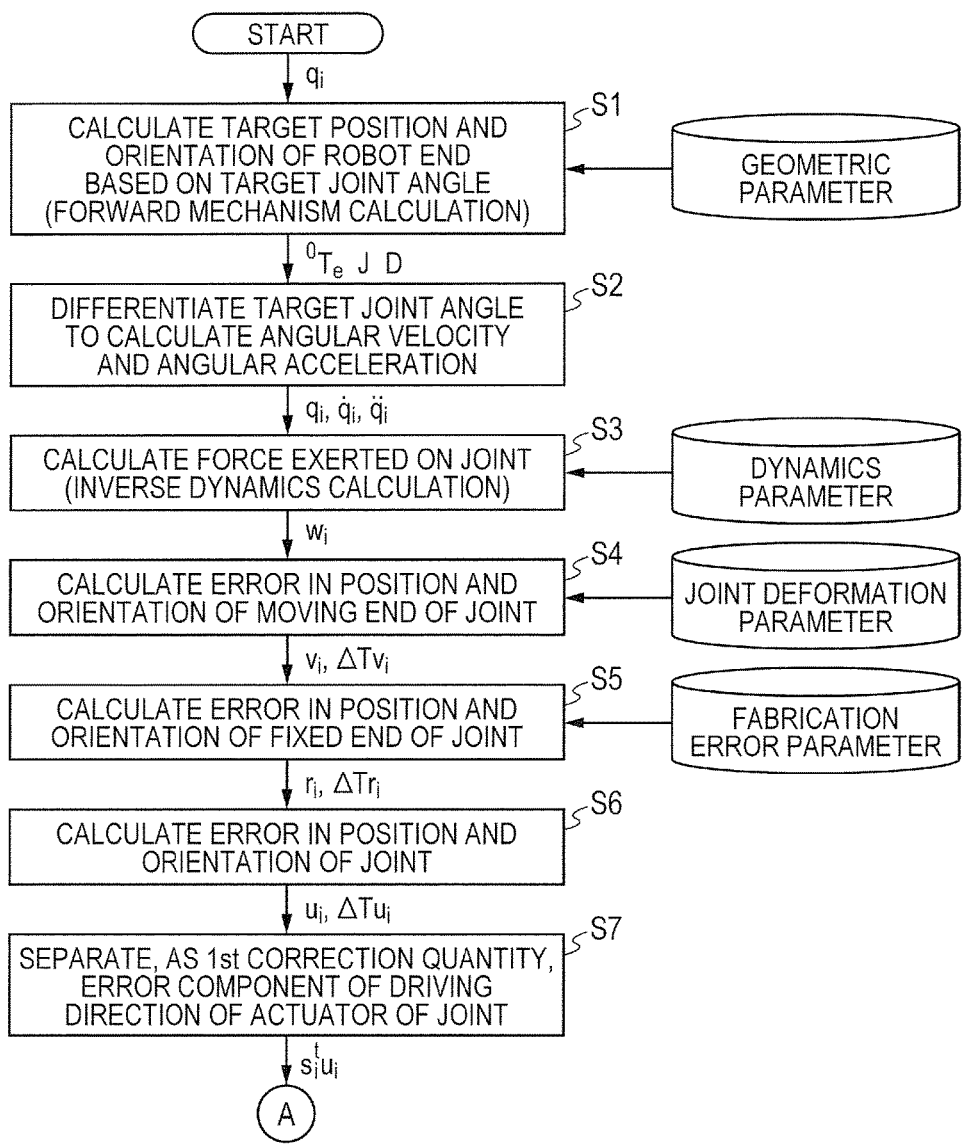
FIG. 3 is comprised of FIGS. 3A and 3B showing a flow chart illustrating a robot controlling method according to the first embodiment.
Figure 3B:
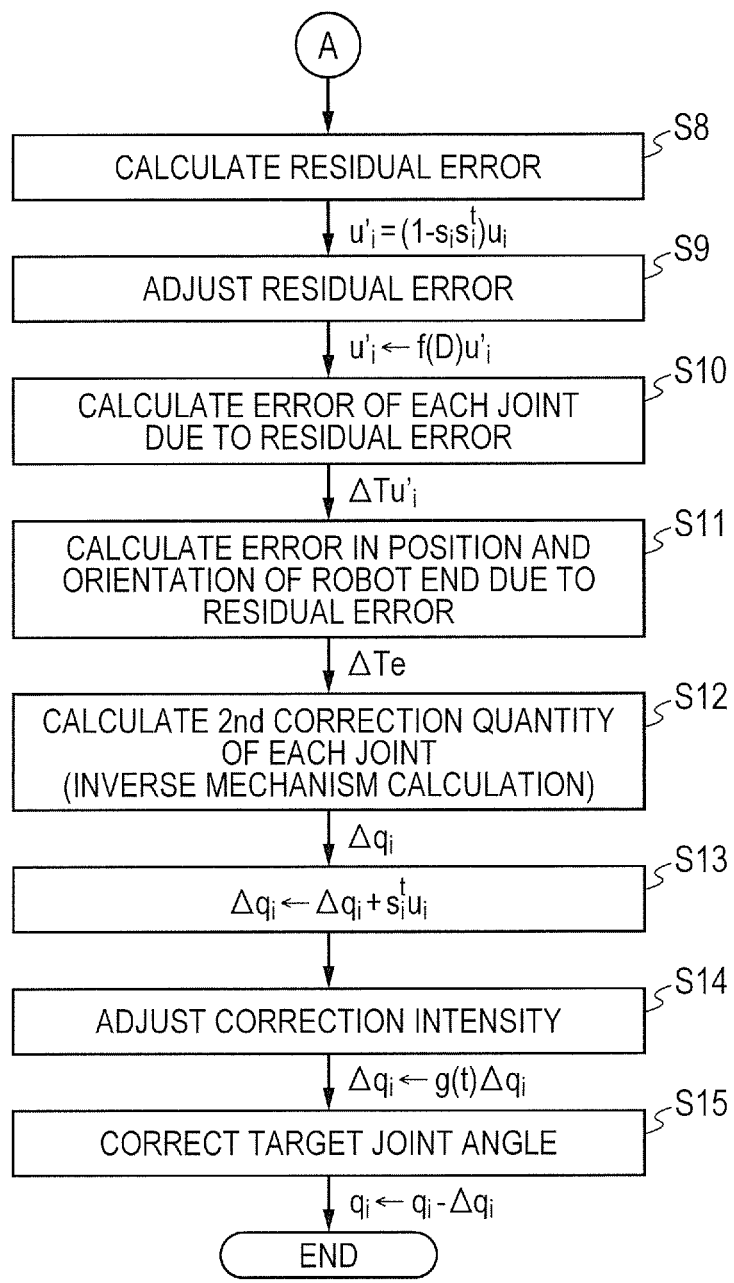

FIG. 3 is a flow chart illustrating a robot controlling method according to the first embodiment of the present invention. The flow chart of FIG. 3 illustrates control by the robot controlling apparatus 300, or more specifically, the CPU 301, that follows the program 330.

The CPU 301 generates a joint instruction value $q_i$ that is a target angle of each joint of the robot 200 based on the data of the teaching points. The CPU 301 uses a correction quantity (correction value) for correcting an error to correct the joint instruction value $q_i$ and outputs a new joint instruction value $q_i$ after the correction. Here, a subscript i of q is 1 to 6 in the 6-axis robot 200 of the present embodiment.

The new joint instruction values $q_i$ after the correction are provided to the servo-controlling apparatus 230 that drives and controls the electric motors 11 of the joints $J_1$ to $J_6$ at certain time intervals, such as time intervals of 2 [ms]. Therefore, the process of the flow chart illustrated in FIG. 3 is executed at each of the time intervals. As described, the time intervals are indicated by $\Delta t$. Although the joints $J_1$ to $J_6$ are rotary joints in the description of the present embodiment, the discussions including the formulas are the same even if the joints are linear motion joints.

Based on the joint instruction value $q_i$ that is the target joint angle, the CPU 301 uses geometric parameters of the robot 200 to calculate the position and orientation of the end point of the robot 200. The calculation method is executed by well-known forward mechanism calculation (forward kinetics calculation).

A coordinate transformation matrix from an i-th joint $J_i$ to a j-th joint $J_j$ is written as $^iT_j$, and the CPU 301 calculates position and orientation $^0T_e$ of the end point of the robot 200 as viewed from the global coordinates $\Sigma_0$ based on the following formula (4).

$$^0T_e = {^0T_1}{^1T_2}{^2T_3}{^3T_4}{^4T_5}{^5T_6}{^6T_e} = \left(\prod_{i=1\ldots 6}{^{i-1}T_i}\right){^6T_e} \quad (4)$$

The coordinate transformation matrix $^iT_j$ of each joint is further divided into two stages as in the following formula (5).

$$^{i-1}T_i = Tr_i Tv_i(q_i) \quad (5)$$

Here, $Tr_i$ is the position and orientation of the fixed end of the i-th joint $J_1$ relative to the moving end (origin of coordinates $\Sigma_{i-1}$) of an (i−1)th joint $J_{i-1}$. The joint $J_i$ is operated by the actuator 10, and the coordinate transformation matrix indicates the position and orientation of the fixed end of the joint $J_i$, that is, the fixed end of the actuator 10. For example, $Tr_2$ is the position and orientation of the fixed end of the second joint $J_2$ relative to the moving end (origin of coordinates $\Sigma_1$) of the first joint $J_1$. The coordinate transformation matrix includes fixed values determined at the design of the robot arm 201.

$Tv_i$ is the position and orientation of the moving end relative to the fixed end of the i-th joint $J_i$. The coordinate transformation matrix indicates the position and orientation of the moving end of the actuator 10, that is, the moving end of the joint. The coordinate transformation matrix including the joint instruction value $q_i$ as a variable indicates the operation of the joint. A rotation coordinate transformation is performed in the 6-axis robot 200. In the 6-axis robot 200 illustrated in FIG. 1, $Tv_1$ indicates a rotation coordinate transformation matrix in which the moving end of the joint $J_1$ rotates by $q_1$ around an $A_i$ axis relative to the fixed end of the joint $J_1$.

The CPU 301 also calculates a Jacobian matrix J of the following formula (6) of the end point of the robot 200 relative to the joint angle of the robot 200 in step S1.

$$J = \frac{\partial CoodTrans^{-1}(^0T_e)}{\partial q_i} \quad (6)$$

The CPU 301 further calculates an absolute value D of a determinant of the Jacobian matrix. A specific calculation procedure of the Jacobian matrix and the determinant is well known, and the details will not be described.

Next, the CPU 301 temporally differentiates the joint instruction value $q_i$ to calculate an angular velocity and an angular acceleration of the angle of the joint $J_i$ (S2). Specifically, the CPU 301 numerically differentiates the joint instruction value $q_i$ provided at each certain time interval $\Delta t$ as in the following formulas (7) and (8).

$$\dot{q}_i = \frac{q_i - q_i^{(1)}}{\Delta t} \quad (7)$$

$$\ddot{q}_i = \frac{\dot{q}_i - \dot{q}_i^{(1)}}{\Delta t} \quad (8)$$

In formulas (7) and (8), (1) on the right side denotes a value of the last time. After the end of the calculation, the CPU 301 updates the values of the last time as in formulas (9) and (10).

$$q_i^{(1)} \leftarrow q_i \quad (9)$$

$$\dot{q}_i^{(1)} \leftarrow \dot{q}_i \quad (10)$$

Arrows denote assignment. Based on the joint instruction value $q_i$, the angular velocity and the angular acceleration, the CPU 301 uses dynamics parameters of the robot 200 to calculate force and torque $w_i$ exerted on the joint $J_i$. The calculation method is known as inverse dynamics calculation. The dynamics parameters include position of the center of gravity, mass and tensor of inertia of the components included in each joint $J_i$. Furthermore, $w_i$ is a vector including six elements of the force and torque, which is called a wrench.

In the first embodiment, the joint $J_i$ includes the actuator 10 and a pair of links $210_{i-1}$ and $210_i$. One of the pair of links $210_{i-1}$ and $210_i$ is fixed to an input axis of the actuator 10, and the other of the pair of links $210_{i-1}$ and $210_i$ is fixed to an output axis of the actuator 10. Therefore, an error in position and orientation $u_i$ of the joint $J_i$ described later can be classified into an error in position and orientation $r_i$ that occurs at the fixed end of the joint $J_1$ and an error in position and orientation $v_i$ that occurs at the moving end of the joint $J_i$ in the first embodiment. Reasons of the occurrence of the errors are also different.

The main reason of the error in position and orientation $r_i$ that occurs at the fixed end of the joint $J_i$ is a fabrication error. This is an assembly error at the installation of the link of the joint $J_i$, a fabrication error of a component or the like.

The main reason of the error in position and orientation $v_i$ that occurs at the moving end of the joint $J_i$ is a deformation caused by external force of the actuator. This is a deformation of the bearing or the reduction gear 12 included in the actuator 10.

The CPU 301 obtains the error in position and orientation (first error in position and orientation) $v_i$ of the joint $J_i$ caused by the deformation of the joint $J_i$ (S4: calculating error in position and orientation of each joint). The error in position and orientation $v_i$ is an error in position and orientation of the link $210_i$ relative to the link $210_{i-1}$ caused by the deformation of the joint $J_i$, that is, an error in position and orientation of the moving end relative to the fixed end of the joint $J_i$. In step S4, the CPU 301 calculates the error in position and orientation $v_i$ of the moving end of the joint $J_i$ based on the force and torque $w_i$ exerted on the joint $J_i$ and based on joint deformation parameters. The joint deformation parameters include a stiffness matrix, a viscosity matrix and the like and are stored in advance in a storage unit (for example, HDD 304). The stiffness will be taken into account here. The following formula (11) is obtained, wherein $K_i$ is the stiffness matrix.

$$v_i = K_i^{-1} w_i \quad (11)$$

The error in position and orientation $v_i$ of the moving end of the joint $J_i$ is expressed by the coordinate transformation matrix as follows.

$$\Delta Tv_i = \text{CoordTrans}(v_i) \quad (12)$$

Next, the CPU 301 obtains the error in position and orientation (second error in position and orientation) $r_i$ of the joint $J_i$ caused by the fabrication error of the robot 200 (S5: calculating error in position and orientation of each joint). The error in position and orientation $r_i$ is an error in position and orientation of the fixed end of the i-th joint $J_i$ relative to the moving end (origin of coordinates $\Sigma_{i-1}$) of the (i−1)th joint $J_{i-1}$ caused by the fabrication error of the link $210_{i-1}$. In step S5, the CPU 301 calculates the error in position and orientation $r_i$ of the fixed end of the joint $J_i$ based on fabrication error parameters of the robot 200.

The fabrication error parameters of the robot 200, that is, the error in position and orientation $r_i$ of the fixed end of the joint $J_i$, are a vector including six elements in three translational directions and three rotation directions. The fabrication error is obtained in advance by using a three-dimensional coordinate measurement apparatus or the like at the fabrication of the robot 200 to directly measure the error or by identifying the error after the fabrication of the robot 200 and is stored in the storage unit (for example, HDD 304). The CPU 301 reads the fabrication error parameters from the storage unit (for example, HDD 304) and obtains the coordinate transformation matrix from the error in position and orientation $r_i$ of the fixed end of the joint $J_i$ based on the following formula (13).

$$\Delta Tr_i = \text{CoordTrans}(r_i) \qquad (13)$$

In this way, two types of errors, that is, the error in position and orientation $\Delta Tv_i$ of the moving end of joint and the error in position and orientation $\Delta Tr_i$ of the fixed end of joint, can be calculated. Therefore, two types of errors that occur at the fixed end and the moving end of the joint $J_i$ can be corrected in later steps.

Next, the CPU 301 calculates an error in position and orientation $\Delta Tu_i$ of the joint $J_i$ from the two types of errors $\Delta Tv_i$ and $\Delta Tr_i$ (S6: calculating error in position and orientation of each joint).

Figure 4:
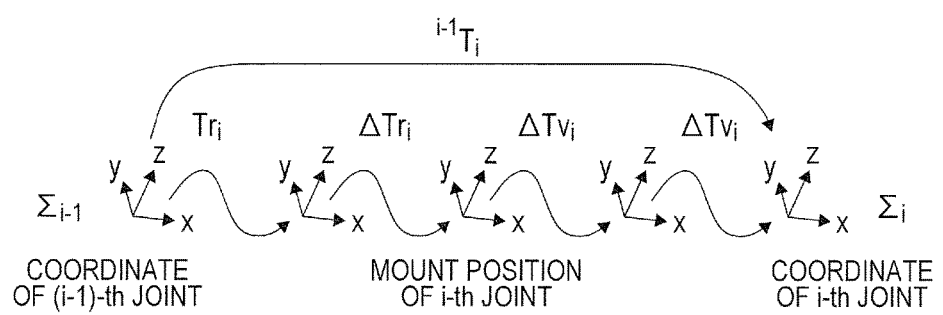
FIG. 4 is an explanatory view for obtaining an error in position and orientation of each joint.

FIG. 4 is an explanatory view for obtaining the error in position and orientation of each joint. The coordinate transformation matrix from the (i−1)th joint $J_{i-1}$ to the i-th joint $J_i$ can be written as in the following formula (14).

$$^{i-1}T_i = Tr_i \Delta Tr_i Tv_i(q_i) \Delta Tv_i \qquad (14)$$

The difference from the coordinate transformation matrix illustrated in step S1 is that terms of errors are added. The CPU 301 calculates the integrated error in position and orientation $\Delta Tu_i$ of joint based on the following formula (15).

$$\Delta Tu_i = Tv_i(q_i)^{-1} \Delta Tr_i Tv_i(q_i) \Delta Tv_i \qquad (15)$$

Consequently, the coordinate transformation matrix from the (i−1)th joint $J_{i-1}$ to the i-th joint $J_i$ is simplified as follows.

$$^{i-1}T_i = Tr_i Tv_i(q_i) \Delta Tu_i \qquad (16)$$

To prepare for the next step, the CPU 301 transforms the error in position and orientation $\Delta Tu_i$ of the joint $J_i$ into the vector expression $u_i$.

$$u_i = \text{CoordTrans}^{-1}(\Delta Tu_i) \qquad (17)$$

The error in position and orientation $u_i$ of the joint $J_i$ is an error of the moving end of the joint $J_i$ relative to the origin of the coordinates $\Sigma_{i-1}$ (particularly, the moving end of the joint $J_{i-1}$ when i=2 to 6).

Based on steps S4 to S6 (calculating error in position and orientation of each joint), the CPU 301 obtains the error in position and orientation $u_i$ of the joint $J_i$ of the robot 200 for each of the joints $J_1$ to $J_6$.

For each of the joints $J_1$ to $J_6$, the CPU 301 uses the error component in the driving direction of the actuator 10 included in the error in position and orientation $u_i$ of the joint $J_i$ obtained in steps S4 to S6 to obtain a first correction quantity for correcting the joint instruction value $q_i$ (S7: calculating first correction quantity).

In the first embodiment, the CPU 301 separates, as the first correction quantity, the error component in the driving direction of the actuator 10 of the joint $J_i$ from the error in position and orientation $u_i$ of the joint $J_i$ in the coordinates $\Sigma_{i-1}$.

More specifically, a vector $s_i$ is first defined, wherein only the component indicating the driving direction of the joint $J_i$ is 1, and the other components are zero. For example, a rotary joint around a Z axis in which the joint $J_i$ is defined by the coordinates $\Sigma_{i-1}$ is as follows.

$$s_i = (0\ 0\ 0\ 0\ 0\ 1)^t \qquad (18)$$

A linear motion joint in an X direction is expressed by $s_i = (1\ 0\ 0\ 0\ 0\ 0)^t$.

When the vector $s_i$ is used, the driving direction component of the joint in the error $u_i$ can be written as in the following formula (19).

$$s_i^t u_i \qquad (19)$$

This is set as the first correction quantity. Therefore, formula (19) is an operation for extracting only an error component $s_i^t u_i$ in the driving direction of the joint $J_i$ from the error in position and orientation $u_i$ of the joint $J_i$. The CPU 301 sets, as the first correction quantity, the error component $s_i^t u_i$ extracted based on formula (19).

For each of the joints $J_1$ to $J_6$, the CPU 301 obtains a residual error $u_i'$ by excluding the error component $s_i^t u_i$ in the driving direction of the actuator 10 of the joint $J_i$ from the error in position and orientation $u_i$ of the joint $J_i$ obtained in steps S4 to S6 (S8: calculating residual error).

The residual error $u_i'$ excluding the error component $s_i^t u_i$ in the driving direction of the joint $J_i$ from the error $u_i$ can be calculated by the following formula (20).

$$u_i' = (1 - s_i s_i^t) u_i \qquad (20)$$

Here, a matrix of 6×6 used for removing the separated error component in the driving direction by setting the error component to zero is expressed in parentheses on the right side in formula (20).

Next, the CPU 301 adjusts the size of the residual error $u_i'$ to be corrected (S9). In the error, while the error component in the driving direction of the actuator 10 of the joint $J_i$ is corrected in the joint space, the residual error $u_i'$ is corrected and calculated in the task space. As described later, in the correction in the task space, the error in position and orientation of the end point of the robot 200 in the global coordinates $\Sigma_0$ is calculated from the residual error $u_i'$, and the correction quantity of each of the joints $J_1$ to $J_6$ is calculated based on inverse mechanism calculation (inverse kinetics calculation). Therefore, a problem of a singular point in the inverse mechanism calculation occurs. The value of the correction quantity is significantly large near the singular point, and the joint of the robot 200 may be largely moved.

Therefore, the size of the residual error to be corrected is adjusted by the following formula (21) according to the distance from the singular point.

$$u_i' \leftarrow f(D) u_i' \qquad (21)$$

Here, an arrow denotes assignment. A function f(D) indicates a weighting factor with a value of 0 to 1 according to the distance from the singular point. When the function f(D) is set to 0 on the singular point, the error to be corrected becomes zero, and as a result, the correction quantity also becomes zero. This can prevent a large movement of the joint of the robot 200 at the singular point (or near the singular point).

Specifically, the following definition is set by utilizing the fact that the determinant of the Jacobian matrix J obtained in step S1 approaches zero with a decrease in the distance from the singular point. The function f(D) is as in the following formula (22), wherein D is a value of the determinant of the Jacobian matrix J, |D| is an absolute value of D, and a determination value $D_0$ of the singular point set in advance is used.

$$f(D) = \begin{cases} -2\left(\frac{|D|}{D_0}\right)^3 + 3\left(\frac{|D|}{D_0}\right)^2 & |D| < D_0 \\ 1 & D_0 \leq |D| \end{cases} \qquad (22)$$

Figure 5A:
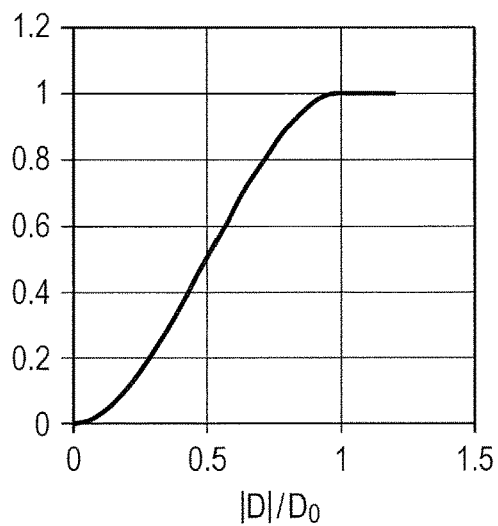
FIG. 5A is a graph illustrating a function indicating a weighting factor of formula (22).

FIG. 5A is a graph illustrating the function indicating the weighting factor of formula (22). As illustrated in FIG. 5A, a smaller weighting factor f(D) can be set for a smaller absolute value |D|.

In this way, the CPU 301 corrects the residual error $u_i'$ by multiplying the residual error $u_i'$ by the weighting factor between 0 and 1 according to the absolute value |D| of the determinant of the Jacobian matrix at the end point of the robot 200.

Next, the CPU 301 uses formula (23) to calculate an error in position and orientation $\Delta Tu_i'$ of each joint $J_i$ based on the residual error $u_i'$ (S10).

$$\Delta Tu_i' = \text{CoordTrans}(u_i') \quad (23)$$

Next, the CPU 301 obtains an error in position and orientation of the end point of the robot 200 based on the residual error $u_i'$ of each of the joints $J_1$ to $J_6$ (S11: calculating error in position and orientation of end point).

Specifically, a coordinate transformation matrix $\Delta T_e$ from the position and orientation of the end point of the robot 200 not including the error to the position of the end point of the robot 200 including the error in position and orientation $\Delta Tu_i'$ of the joint is calculated by formula (24).

$$\Delta T_e = \left(\prod_i (Tr_i Tv_i(q_i - s_i^t u_i))\right)^{-1} \prod_i (Tr_i Tv_i(q_i - s_i^t u_i) \Delta Tu_i') \quad (24)$$

An argument $q_i - s_i^t u_i$ of the coordinate transformation $Tv_i$ on the right side indicating the joint operation is provided to subtract the error component in the driving direction of the joint $J_i$ from the target value, which is our contrivance that is one of the features of the present embodiment. This contrivance can reduce the size of the error in position and orientation $\Delta T_e$ of the end point of the robot 200.

Instead of using formula (24), the calculation may be performed by a simple formula of the following formula (25), in which the error in position and orientation $\Delta Tu_i'$ of the joint is sequentially transformed into the coordinates of the end point of the robot 200.

$$\Delta T_e = \prod_i ({}^e T_i \Delta Tu_i' {}^e T_i^{-1}) \quad (25)$$

For each of the joints $J_1$ to $J_6$, the CPU 301 obtains a second correction quantity $\Delta q_i$ for correcting the joint instruction value $q_i$ by using the error in position and orientation of the joint $J_i$ based on the error in position and orientation $\Delta T_e$ of the end point of the robot 200 obtained in S11 (S12: calculating second correction quantity). In this case, the CPU 301 calculates the second correction quantity $\Delta q_i$ of each of the joints $J_1$ to $J_6$ from the error $\Delta T_e$ of the end point of the robot 200 based on inverse mechanism calculation (inverse kinetics calculation).

Here, there can be a method of calculating the joint angles from the position of the end point of the robot 200 with the error and the position of the end point of the robot 200 without the error and setting the difference as a correction quantity. However, the inverse mechanism calculation needs to be executed twice in the method.

Therefore, the CPU 301 performs more simple and practical calculation in the first embodiment. The CPU 301 uses an inverse matrix of the Jacobian matrix J obtained in step S1 to calculate the second correction quantity $\Delta q_i$ that is ($\Delta q_1$, $\Delta q_2$, $\Delta q_3$, $\Delta q_4$, $\Delta q_5$, $\Delta q_6$), as in the following formula (26).

$$\Delta q = J^{-1} \text{CoordTrans}^{-1}({}^0 T_e \Delta T_e {}^0 T_e^{-1}) \quad (26)$$

The calculation in the parentheses on the right side is for changing the error $\Delta T_e$ of the end point of the robot 200 to an expression by the global coordinates $\Sigma_0$.

Since the inverse matrix of the Jacobian matrix J cannot be calculated at the singular point of the robot 200, a generalized inverse matrix is used instead. The residual error to be corrected in step S9 is already adjusted and reduced near the singular point, and the second correction quantity $\Delta q_i$ does not become too large.

The CPU 301 adds the first correction quantity $s_i^t u_i$ of the driving direction component separated in step S7 and the second correction quantity $\Delta q_i$ and sets the result thereof as a new correction quantity (total correction quantity) $\Delta q_i$ (S13).

Specifically, the following formula (27) is obtained. An arrow denotes assignment.

$$q_i \leftarrow \Delta q_i + s_i^t u_i \quad (27)$$

Next, the CPU 301 adjusts correction intensity in the first embodiment (S14). In the first embodiment, the robot controlling apparatus 300, that is, the CPU 301, includes a correcting mode for correcting the joint instruction value $q_i$ and a non-correcting mode for not correcting the joint instruction value $q_i$. The CPU 301 also includes a transition mode (first transition mode) upon a switch from the non-correcting mode to the correcting mode and a transition mode (second transition mode) upon a switch from the correcting mode to the non-correcting mode.

The correcting mode and the non-correcting mode are switched by an instruction by the worker (for example, by a signal from the teaching pendant 400), and the CPU 301 switches the mode through the transition mode instead of immediately switching the mode to one of the correcting mode and the non-correcting mode. The flow chart illustrated in FIG. 3 is a flow chart when the CPU 301 is in the transition mode, and step S14 is skipped in FIG. 3 when the CPU 301 is in the correcting mode.

Whether to perform the correction needs to be adjusted at the start of the correction of the joint instruction value $q_i$. Therefore, the CPU 301 makes an adjustment in the first embodiment by using a function g(t) indicating a factor in which the correction intensity changes from 0 to 1 with time.

$$\Delta q_i \leftarrow g(t) \Delta q_i \quad (28)$$

More specifically, in the transition mode (first transition mode), the CPU 301 corrects the total correction quantity $\Delta q_i$ by multiplying the total correction quantity $\Delta q_i$ that is a sum of the first correction quantity and the second correction quantity by the factor g(t) that increases from 0 to 1 with time.

The function that increases from 0 to 1 with time is as in the following formula (29). A switching time $t_0$ is a value such as 0.5 seconds.

$$g(t) = \begin{cases} 0 & t < 0 \\ t/t_0 & 0 \leq t < t_0 \\ 1 & t_0 \leq t \end{cases} \quad (29)$$

Figure 5B:
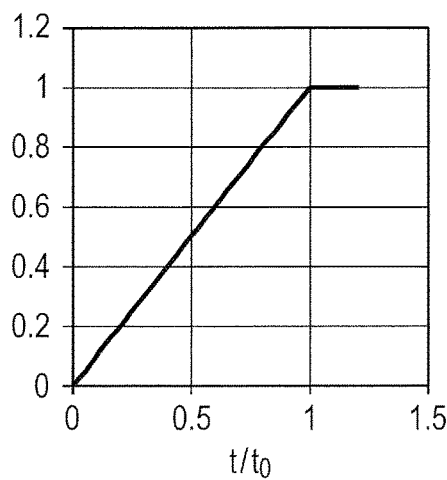
FIG. 5B is a graph illustrating a function indicating a factor of formula (29).

FIG. 5B is a graph illustrating the function indicating the factor of formula (29). A function of the following formula (30) for smoother switching is also effective.

$$g(t) = \begin{cases} 0 & t < 0 \\ -2(t/t_0)^3 + 3(t/t_0)^2 & 0 \le t < t_0 \\ 1 & t_0 \le t \end{cases} \quad (30)$$

Figure 5C:
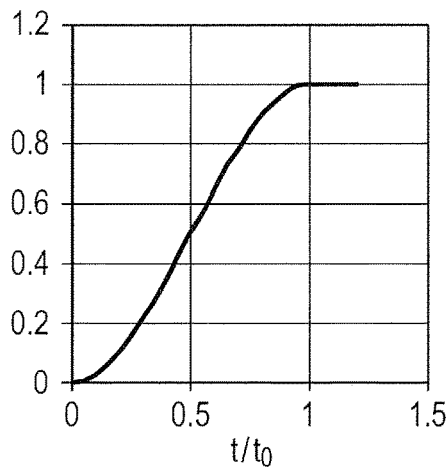
FIG. 5C is a graph illustrating a function indicating a factor of formula (30).

FIG. 5C is a graph illustrating the function indicating the factor of formula (30).

Whether to perform the correction needs to be adjusted at the end of the correction of the joint instruction value $q_i$. Therefore, the CPU 301 makes an adjustment in the first embodiment by using a function indicating a factor in which the correction intensity changes from 0 to 1 with time. In the function, the factor can be reduced from 1 to 0 by horizontally inverting the function illustrated in one of FIGS. 5B and 5C.

More specifically, in the transition mode (second transition mode), the CPU 301 corrects the total correction quantity $\Delta q_i$ by multiplying the total correction quantity $\Delta q_i$ that is a sum of the first correction quantity and the second correction quantity by the factor that decreases from 1 to 0 with time.

For each of the joints $J_1$ to $J_6$, the CPU 301 uses the first correction quantity and the second correction quantity to correct the joint instruction value $q_i$ (S15: correcting). More specifically, the CPU 301 subtracts the lastly obtained correction quantity $\Delta q_i$ from the joint instruction value $q_i$ as illustrated in formula (31) and outputs a new joint instruction value $q_i$.

$$q_i \leftarrow q_i - \Delta q_i \quad (31)$$

The total correction quantity $\Delta q_i$ obtained in step S13 is corrected, and the corrected total correction quantity $\Delta q_i$ is subtracted from the joint instruction value $q_i$ to make a correction in the description of step S14. However, the correction is not limited to this.

More specifically, at least one of the first correction quantity $s_i{}^t u_i$ and the second correction quantity $\Delta q_i$ (preferably, the first correction quantity $s_i{}^t u_i$) may be corrected in step S14. In this case, the CPU 301 can multiply at least one of the first correction quantity and the second correction quantity by a factor that increases from 0 to 1 with time to correct at least one of the first correction quantity and the second correction quantity in the transition mode (first transition mode). The CPU 301 can subtract the first correction quantity and the second correction quantity, at least one of which is corrected, from the joint instruction value $q_i$ to make a correction in step S15.

In the transition mode (second transition mode), the CPU 301 can multiply at least one of the first correction quantity and the second correction quantity by a factor that decreases from 1 to 0 with time to correct at least one of the first correction quantity and the second correction quantity. In step S15, the CPU 301 can subtract the first correction quantity and the second correction quantity, at least one of which is corrected, from the joint instruction value $q_i$ to make a correction.

In the correcting mode, the CPU 301 can subtract the first correction quantity and the second correction quantity, not corrected, from the joint instruction value $q_i$ in step S15.

In this way, the first correction quantity $s_i{}^t u_i$ for correcting the joint instruction value $q_i$ of the joint $J_i$ can be directly obtained by using the error component in the driving direction of the actuator 10 of the joint $J_i$, and the correction error included in the first correction quantity $s_i{}^t u_i$ can be reduced.

The residual error $u_i'$ excluding the error component in the driving direction of the actuator included in the error in position and orientation $u_i$ of the joint $J_i$ is smaller than the error component in the driving direction of the actuator. Therefore, the second correction quantity $\Delta q_i$ obtained from the error in position and orientation of the end point of the robot 200 based on the residual error $u_i'$ of each joint is smaller than the first correction quantity $s_i{}^t u_i$.

Therefore, even if the second correction quantity $\Delta q_i$ includes the correction error when the second correction quantity $\Delta q_i$ of each joint is obtained from the error in position and orientation of the end point of the robot, the second correction quantity $\Delta q_i$ is small, and the correction error included in the second correction quantity $\Delta q_i$ is also small. As a result, according to the first embodiment, complicated loop calculation, such as convergent calculation, does not have to be performed to obtain the first correction quantity and the second correction quantity, and the amount of calculation, that is, calculation time, required for the calculation of the total correction quantity $\Delta q_i$ can also be reduced. Since the first correction quantity and the second correction quantity with small correction errors are used to correct the joint instruction value $q_i$, the error in position and orientation of the end point of the robot 200 is reduced, and highly accurate operation of the robot 200 is possible.

Furthermore, in the first transition mode in which the non-correcting mode without correction is switched to the correcting mode with correction, a rapid motion of each joint is prevented by multiplying the total correction quantity (or at least one of the first correction quantity and the second correction quantity) by the factor that increases from 0 to 1 with time.

Conversely, in the second transition mode in which the correcting mode is switched to the non-correcting mode, a rapid motion of each joint is prevented by multiplying the total correction quantity (or at least one of the first correction quantity and the second correction quantity) by the factor that decreases from 1 to 0 with time. In this way, smooth switching is possible in each transition mode, and a rapid motion of each joint in each transition mode is prevented.

Furthermore, the obtained residual error is corrected according to the absolute value |D| of the determinant of the Jacobian matrix, that is, the distance to the singular point, and stable operation of the robot 200 is possible near the singular point.

Next, a result of the simulation will be described. One of the features of the first embodiment is to separate the driving direction component of the actuator of the joint $J_i$ from the error in position and orientation of the joint $J_i$. Therefore, the correction error of the correction quantity obtained by performing the separation calculation and the correction error of the correction quantity obtained without performing the separation calculation are verified.

Figure 6:
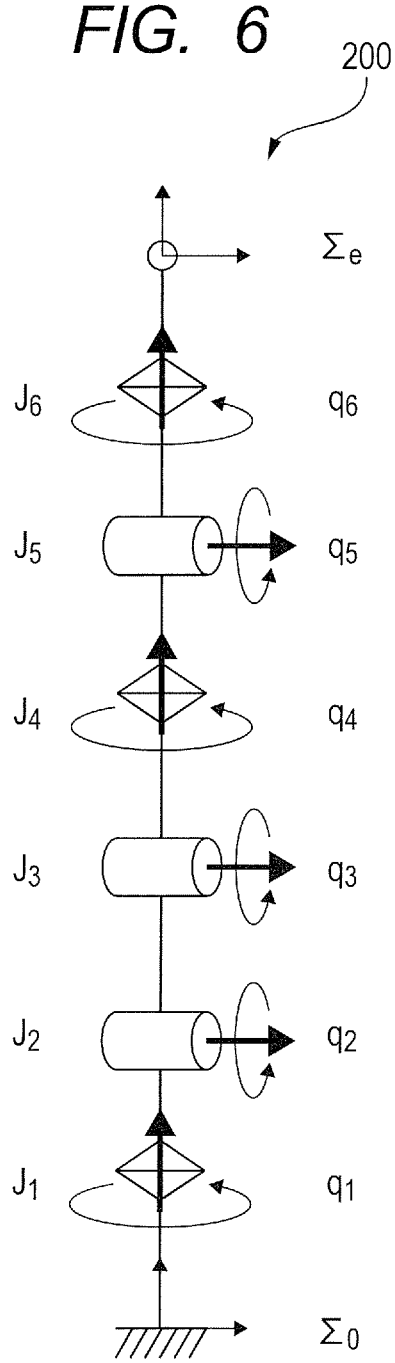
FIG. 6 is a schematic diagram illustrating an axis configuration of a robot used in a simulation.
Figure 7:
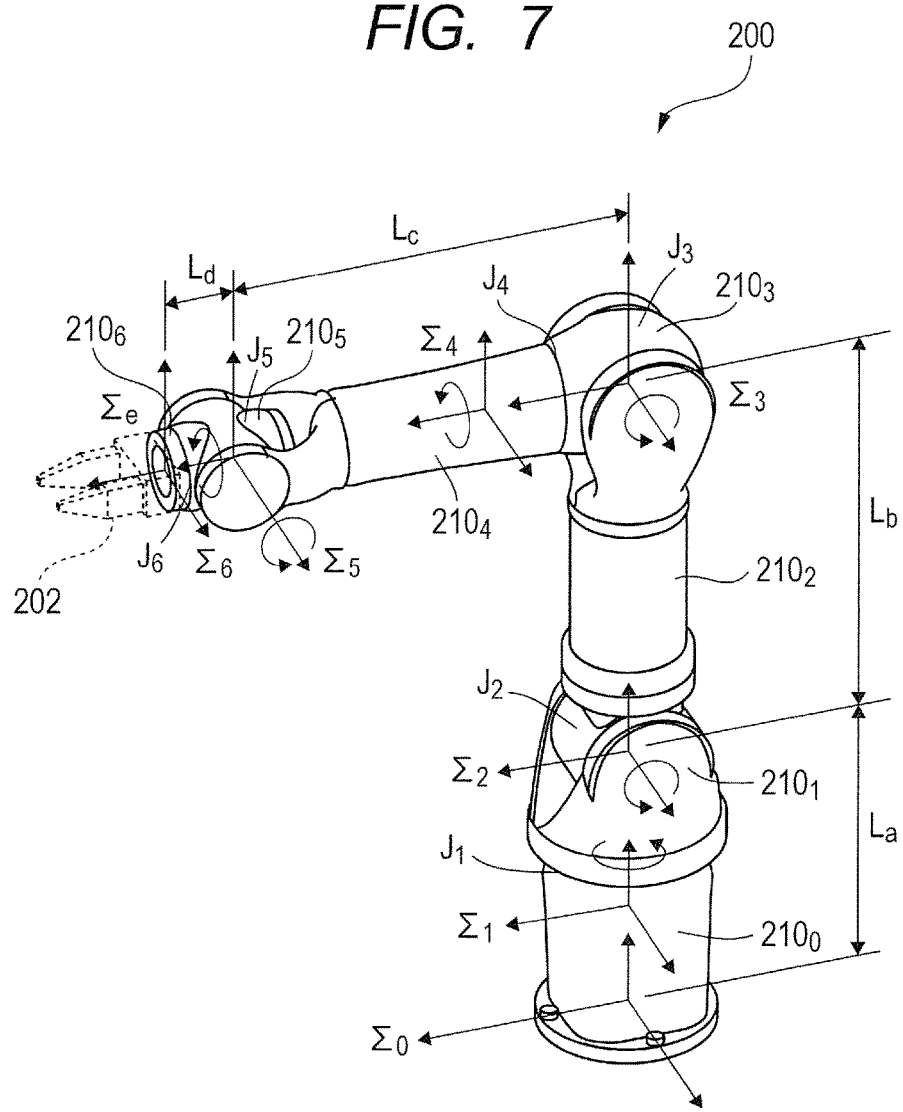
FIG. 7 is a perspective view illustrating the robot used in the simulation.

FIG. 6 is a schematic diagram illustrating an axis configuration of the robot 200 used in the simulation. FIG. 7 is a perspective view illustrating the robot 200 used in the simulation. The coordinates $\Sigma_0$ are global coordinates that are coordinates fixed to the base end (base) of the robot 200, that is, the link $210_0$. The coordinates $\Sigma_e$ are coordinates fixed to the end point of the robot 200.

All of the six joints $J_1$ to $J_6$ are rotary joints. The coordinates fixed to the joints $J_1$ to $J_6$ are indicated by $\Sigma_1$ to $\Sigma_6$, respectively, and the rotation angles of the joints $J_1$ to $J_6$ are indicated by $q_1$ to $q_6$, respectively. Although the coordinates of the fifth joint $J_5$ and the sixth joint $J_6$ overlap, the direction of rotation is different.

As illustrated in FIG. 7, a distance $L_a$ from the origin (base) of the coordinates $\Sigma_0$ to the second joint $J_2$ (origin of the coordinates $\Sigma_2$) is 200 [mm]. A distance $L_b$ from the second joint $J_2$ (origin of the coordinates $\Sigma_2$) to the third joint $J_3$ (origin of the coordinates $\Sigma_3$) is 260 [mm]. A distance $L_c$ from the third joint $J_3$ (origin of the coordinates $\Sigma_3$) to the fifth joint $J_5$ (origin of the coordinates $\Sigma_5$) is 260 [mm]. A distance $L_d$ from the fifth joint $J_5$ (origin of the coordinates $\Sigma_5$) to the end point of the robot 200 (end point of the robot arm 201, origin of the coordinates $\Sigma_e$) is 40 [mm].

Figure 8:
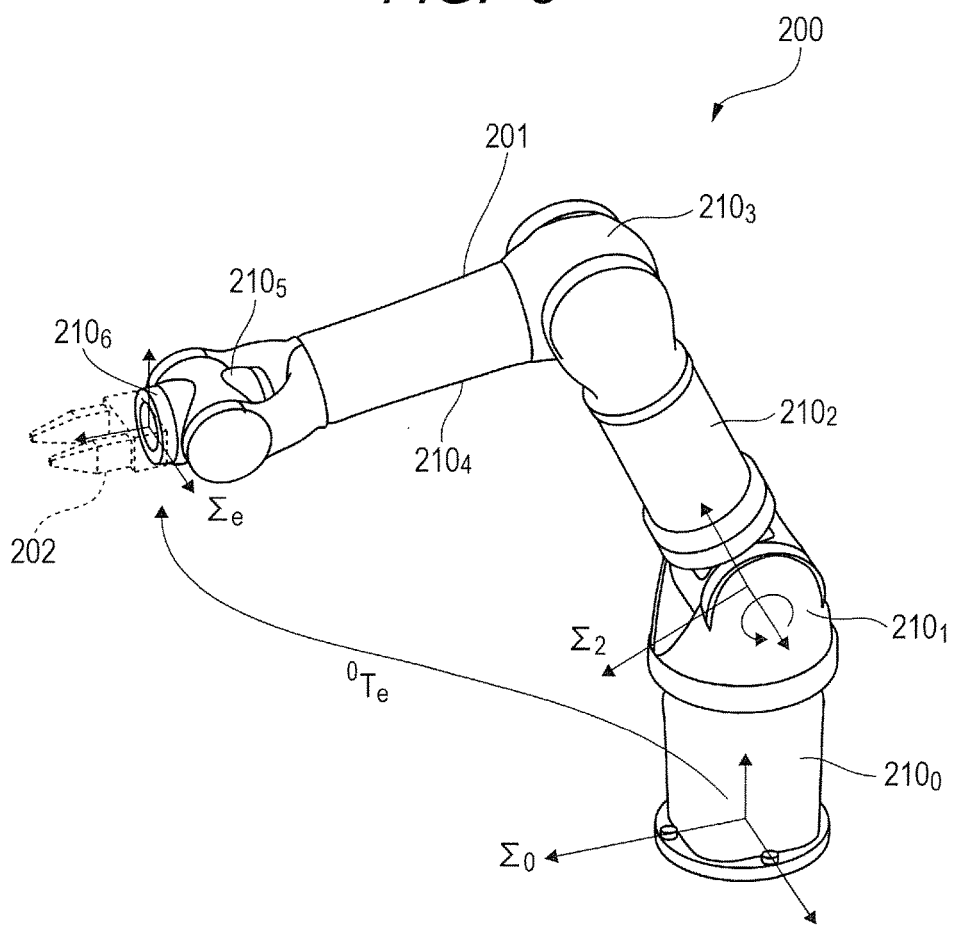
FIG. 8 is a perspective view illustrating an orientation of the evaluated robot.

FIG. 8 is a perspective view illustrating the orientation of the evaluated robot 200. The position of the coordinate transformation matrix $^0T_e$ from the base of the robot 200 to the end point of the robot 200 is (400, 0, 400), and the orientation of the end point of the robot 200 is in the horizontal direction as in FIG. 8.

As described, there are two types of errors in position and orientation of joint, the error in position and orientation $r_j$ of the fixed end of joint and the error in position and orientation $v_j$ of the moving end of joint.

The error in position is set to zero because the effect is small. Of the errors of the moving end of joint, the error in orientation in the rotation direction of the actuator 10 of the joint $J_i$ is 0.5 degrees, and the others are 0.05 degrees. This is because the joint is connected to the reduction gear 12, and the stiffness is lower than in the other rotation directions.

In summary, the errors are set as follows.

$\Delta Tr_i$=CoordTrans(0 0 0 0.05 deg 0.05 deg 0.05 deg)

$\Delta Tv_i$=CoordTrans(0 0 0 0.05 deg 0.05 deg 0.5 deg) (32)

Under the calculation conditions, the correction with the separation calculation of the first embodiment is performed according to the flow chart of FIG. 3 described above. The correction is not near the singular point under the calculation conditions, and the adjustment of the residual error of step S9 is not performed. Therefore, f(D)=1 is set. The correction intensity is not adjusted, either. Therefore, g(t)=1 is set.

On the other hand, in the compared calculation, the driving direction component of the joint is not separated, and the error in position and orientation of the end point of the robot 200 is calculated from the errors of the joint illustrated in formula (32). The difference between the error in position and orientation and the target value is calculated to calculate the correction quantity of the joint.

The following table illustrates calculation results of the case in which the driving direction component of the error of the joint is separated and the case in which the driving direction component of the error of the joint is not separated.

TABLE 1

| Correction errors at target position (400, 0, 400) of robot end. In mm | | | |
| --- | --- | --- | --- |
| Separation calculation | X | Y | Z |
| Not performed | −0.178 | −0.071 | −0.057 |
| Performed (first embodiment) | −0.014 | −0.040 | −0.003 |

Comparing the sizes of the error vectors described above, the size of the error vector is 0.200 [mm] without the separation calculation and is 0.043 [mm] (about ⅕) with the separation calculation (first embodiment). As a result, the correction error can be improved to about ⅕.

According to the first embodiment, the error of joint can be accurately corrected, and highly accurate operation of the robot 200 is possible.

Second Embodiment

Figures 9, 9A, 9B:
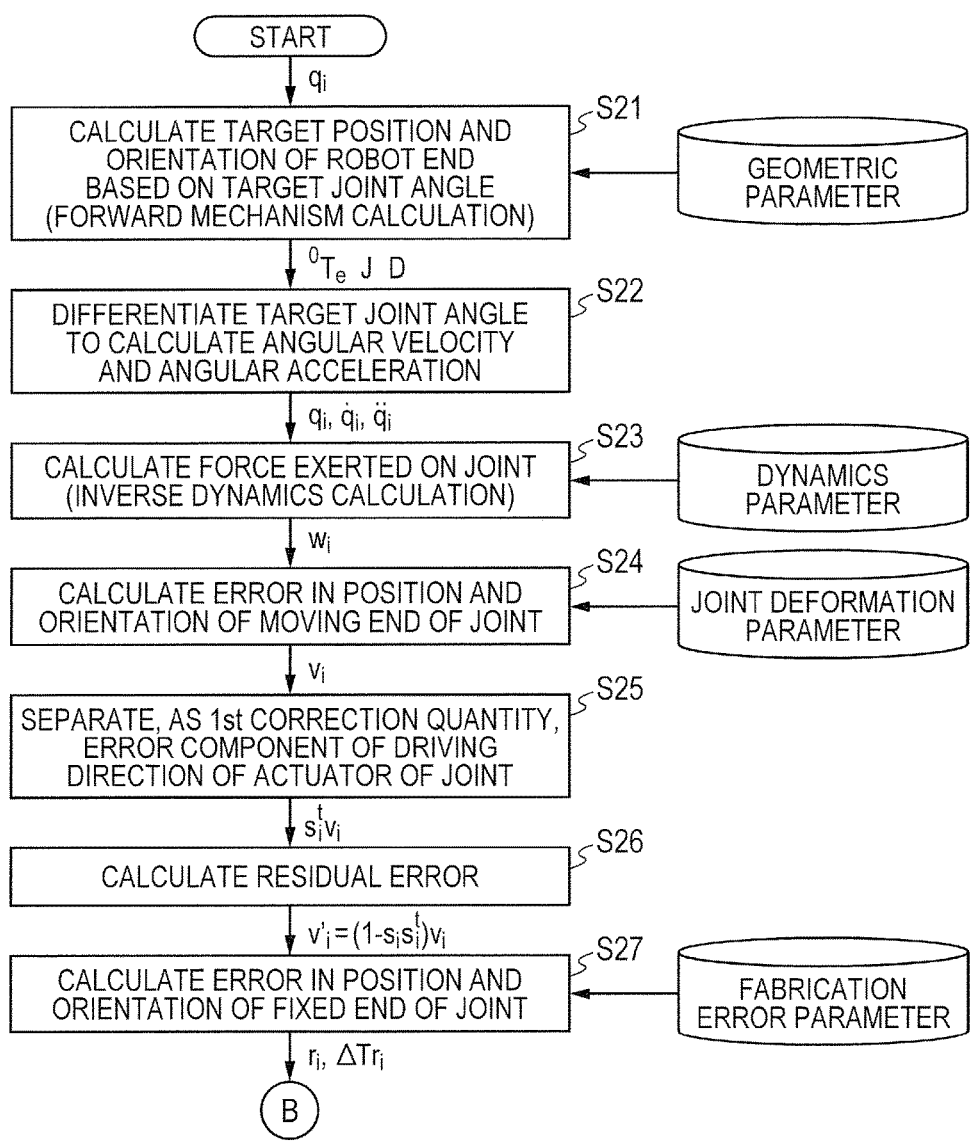
FIG. 9 is comprised of FIGS. 9A and 9B showing a flow chart illustrating a robot controlling method according to a second embodiment.
Figure 9B:
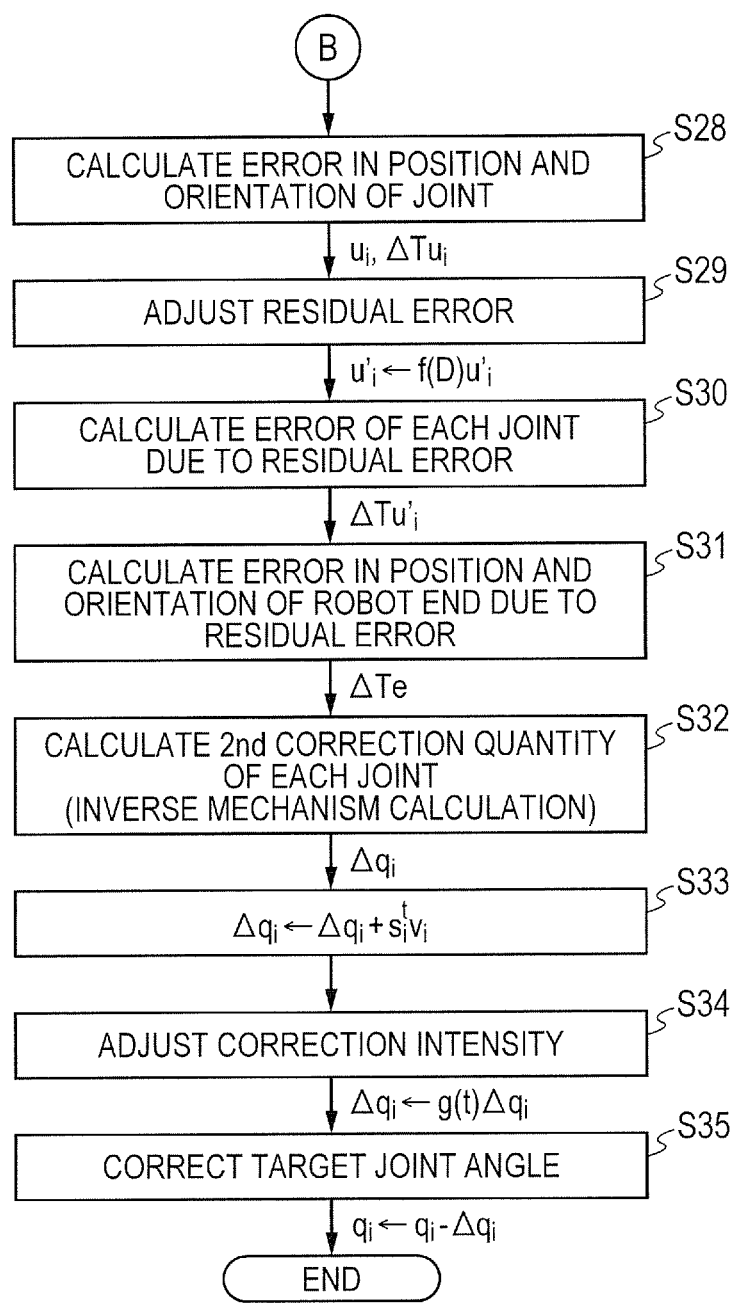

Next, a robot controlling method in a robot apparatus according to a second embodiment of the present invention will be described. FIG. 9 is a flow chart illustrating the robot controlling method according to the second embodiment of the present invention. A configuration of the robot apparatus according to the second embodiment is the same as the configuration of the robot apparatus illustrated in FIGS. 1 and 2 described in the first embodiment, and the description will not be repeated.

The flow chart of FIG. 9 illustrates control by the robot controlling apparatus 300, or specifically, the CPU 301, that follows the program 330.

In the second embodiment, the order of separating the joint driving direction component from the entire errors is different from the first embodiment. The different point will be mainly described here. As described in FIG. 1, the actuators 10 with combinations of the motors 11 and the reduction gears 12 drive the joints $J_1$ to $J_6$ of the robot 200. The stiffness in the rotation direction of the reduction gear 12 is smaller than the stiffness in the other directions supported by the bearing. Therefore, the stiffness of the joints $J_1$ to $J_6$ is the lowest in the rotation direction. As a result, a large effect can be expected even if only a torsional deformation in the rotation direction of the reduction gear 12 (driving direction of the actuator 10) is focused.

The errors in position and orientation $u_i$ of the joint $J_i$ includes the error in position and orientation $v_i$ of the moving end of joint and the error in position and orientation $r_i$ of the fixed end of joint. Therefore, a large effect can be expected even if the first correction quantity is separated after the calculation of the error in position and orientation $v_i$ of the moving end of joint where the torsional deformation of the reduction gear 12 occurs.

Steps S21 to S23 and S29 to S35 illustrated in FIG. 9 are the same as steps S1 to S3 and S9 to S14 illustrated in FIG. 3, respectively, and the description will not be repeated.

In step S24, the CPU 301 calculates the error in position and orientation $v_i$ of the moving end of the joint $J_i$ from the force and torque $w_i$ exerted on the joint $J_i$ and the joint deformation parameters as in step S4. However, the coordinate transformation matrix $\Delta Tv_i$ does not have to be calculated, and the amount of calculation is smaller than in the first embodiment.

In step S25, the CPU 301 separates, as the first correction quantity $s_i^t v_i$, the error component in the driving direction of the actuator 10 of the joint $J_i$ from the error in position and orientation $v_i$ that is the first error in position and orientation (calculating first correction quantity). Therefore, in step S25, the CPU 301 uses the error component in the driving direction of the actuator 10 included in the error in position and orientation $v_i$ of the joint $J_i$ to obtain the first correction quantity $s_i^t v_i$.

In step S26, the CPU 301 uses the following formula (33) to obtain the residual error $v_i'$.

$v_i'=(1-s_i s_i^t)v_i$ (33)

In step S27, the CPU 301 calculates the errors in position and orientation $r_i$ and $\Delta Tr_i$ of the fixed end of the joint $J_i$ from the fabrication error parameters of the robot 200. Step S27 is the same as step S5 of FIG. 3.

In step S28, the CPU 301 integrates the residual error $v_i'$ and the error in position and orientation $\Delta Tr_i$ of the fixed end of joint to calculate the error in position and orientation $\Delta Tu_i'$ of the joint $J_i$. The dash (') is provided here to indicate that the component in the joint driving direction is already separated.

As in the first embodiment, the calculation is based on the following formulas (34) and (35).

$\Delta Tv_i'$=CoordTrans($v_i'$) (34)

$\Delta Tu_i = Tv_i(q_i)^{-1} \Delta Tr_i Tv_i(q_i) \Delta Tv_i'$ (35)

According to the second embodiment, the error of joint can be accurately corrected as in the first embodiment, and highly accurate operation of the robot 200 is possible.

Third Embodiment

Figure 10:
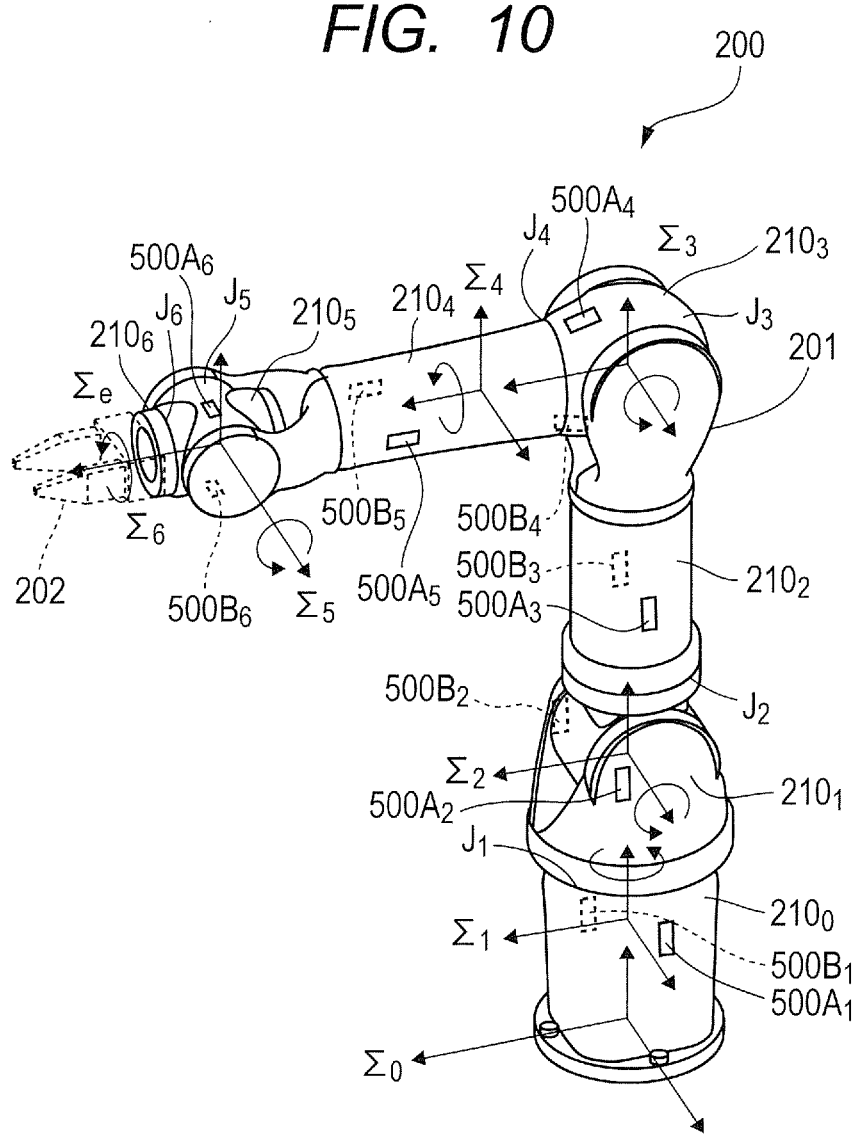
FIG. 10 is a perspective view of a robot of a robot apparatus according to a third embodiment.
Figure 11:
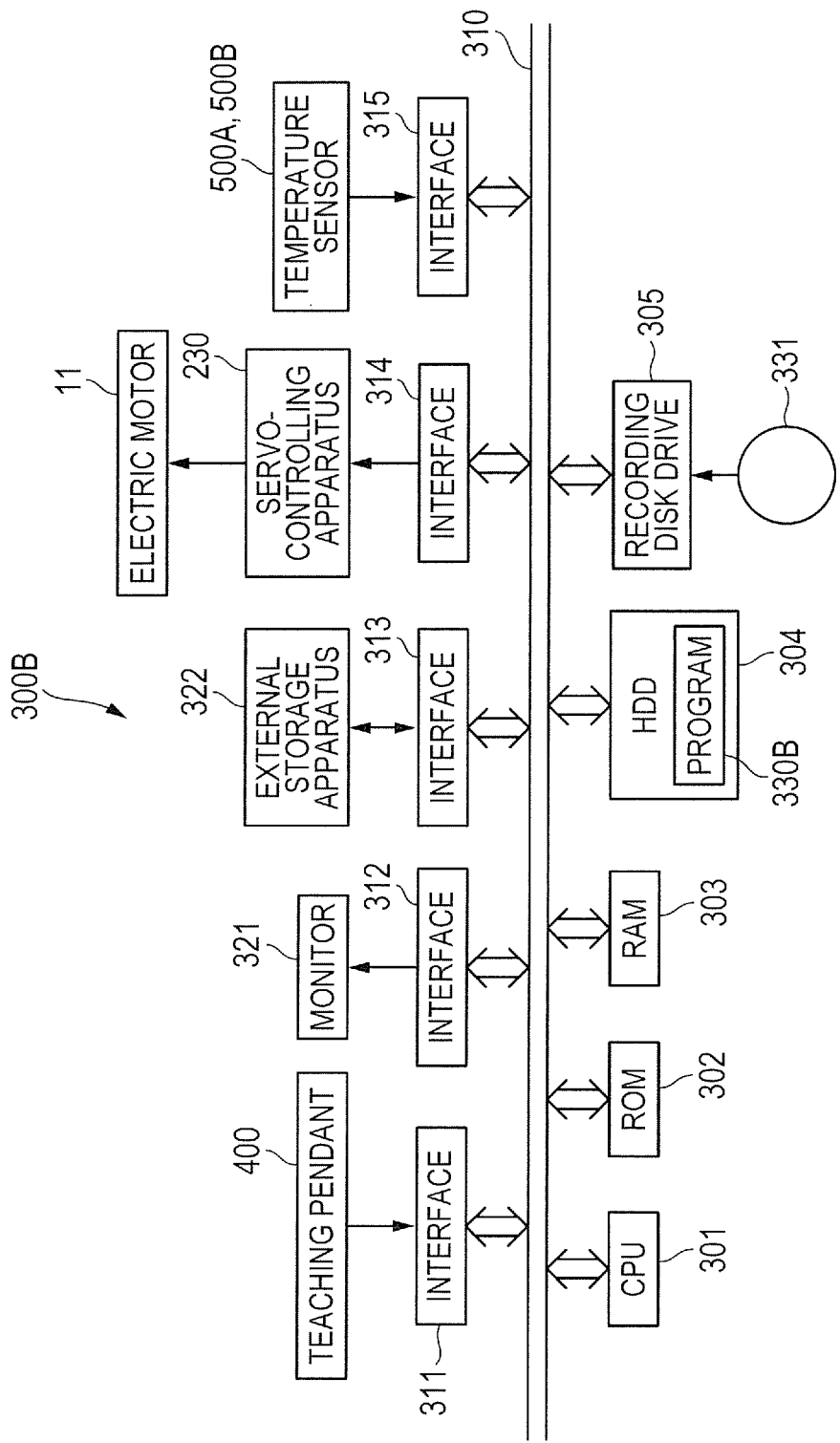
FIG. 11 is a block diagram illustrating a robot controlling apparatus of the robot apparatus according to the third embodiment.

Next, a robot controlling method in a robot apparatus according to a third embodiment of the present invention will be described. FIG. 10 is a perspective view of a robot of the robot apparatus according to the third embodiment of the present invention. FIG. 11 is a block diagram illustrating a robot controlling apparatus of the robot apparatus according to the third embodiment of the present invention. In the third embodiment, the same components as in the first and second embodiments are designated with the same signs, and the description will not be repeated.

In the description of the first embodiment, the errors in position and orientation of the fixed end of the joint $J_i$ are provided in advance as fabrication error parameters. The third embodiment is different from the first embodiment in that the fabrication error parameters are corrected based on detection values of a plurality of temperature sensors provided at each position of the robot 200.

In the robot 200 illustrated in FIG. 10, pairs of temperature sensors $500A_i$ and $500B_i$ are fixed and provided on the links $210_{i-1}$ (i=1 to 6). Although two temperature sensors 500A and 500B are fixed to each link 210 in the description of the third embodiment, the number of temperature sensors is not limited.

As illustrated in FIG. 11, the temperature sensors 500A ($500A_1$ to $500A_6$) and 500B ($500B_1$ to $500B_6$) are connected to the bus 310 through the interface 315 of a robot controlling apparatus 300B. The CPU 301 acquires detection results of the temperature sensors 500A and 500B through the bus 310. The CPU 301 corrects the joint instruction values $q_1$ to $q_6$ of the joints $J_1$ to $J_6$ according to a program 330B.

Figures 12, 12A:
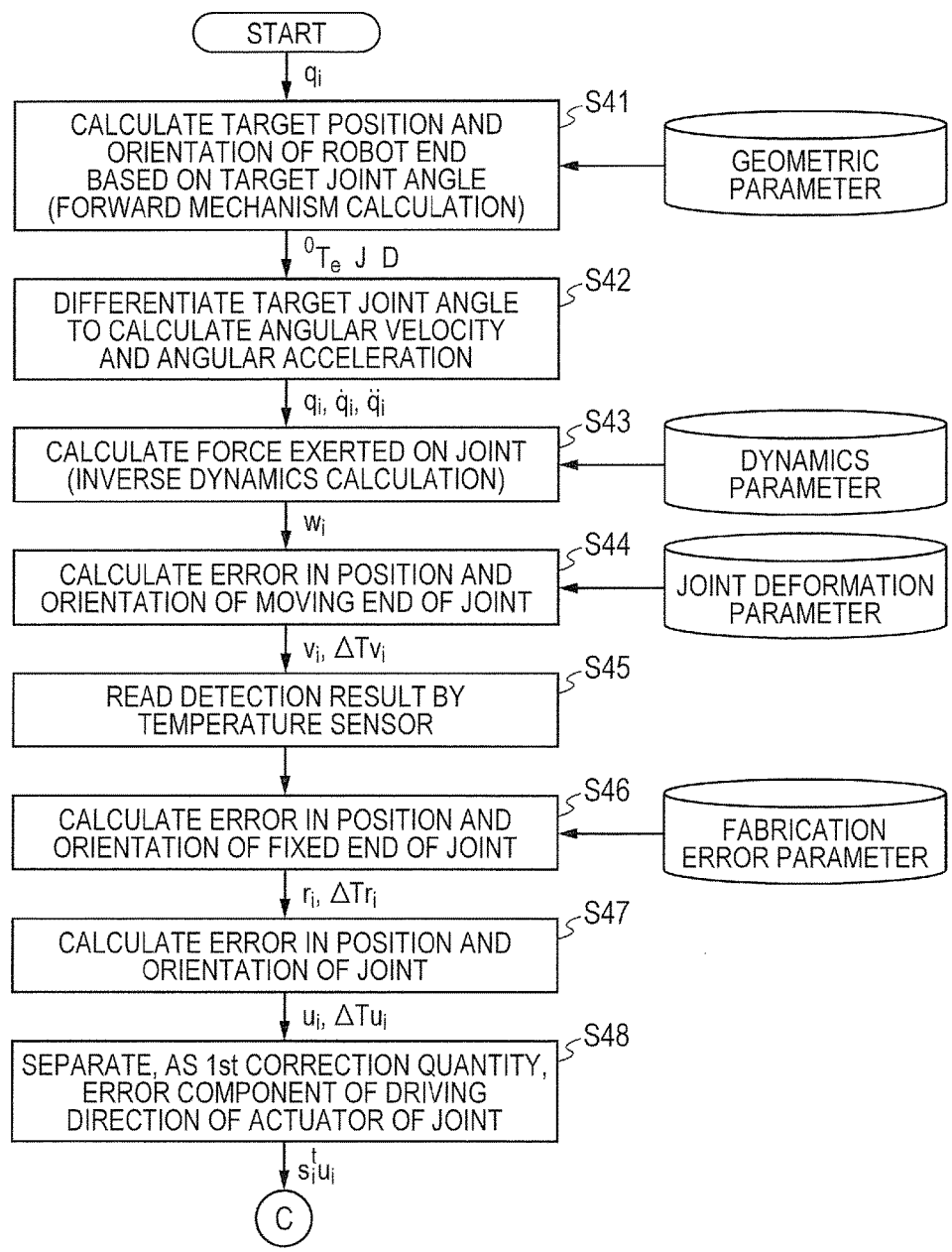
FIG. 12 is comprised of FIGS. 12A and 12B showing a flow chart illustrating a robot controlling method according to the third embodiment.
Figure 12B:
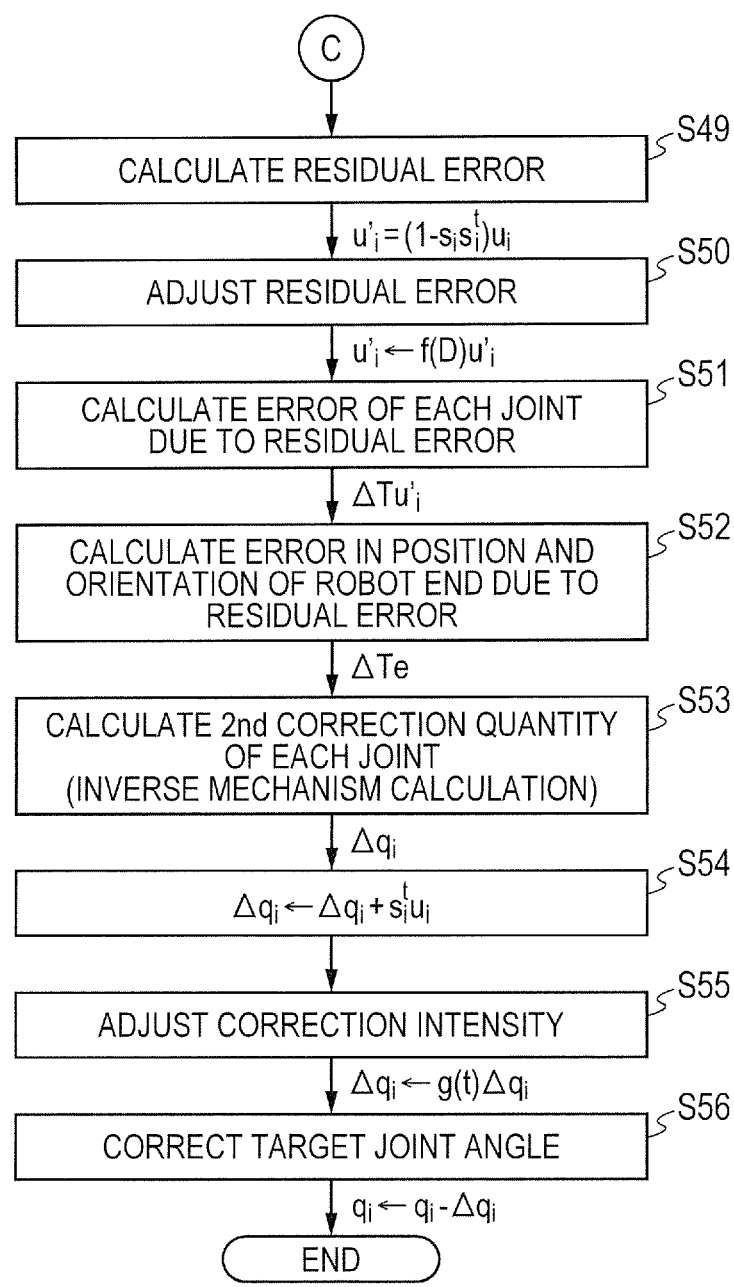

FIG. 12 is a flow chart illustrating a robot controlling method according to the third embodiment of the present invention. The flow chart of FIG. 12 illustrates control by the robot controlling apparatus 300, or specifically, the CPU 301, that follows the program 330B.

Steps S41 to S44 and S47 to S56 illustrated in FIG. 12 are the same as steps S1 to S4 and S6 to S15 illustrated in FIG. 3, respectively, and the description will not be repeated.

In step S45, the CPU 301 reads the values of the temperature sensors 500A ($500A_1$ to $500A_6$) and 500B ($500B_1$ to $500B_6$). The larger the number of temperature sensors, the more accurate the distribution of the temperature. However, the cost increases with an increase in the number of temperature sensors, and about two or three temperature sensors per joint $J_i$ is realistic. In the description of the third embodiment, two sensors are installed on each joint.

Figure 13A:
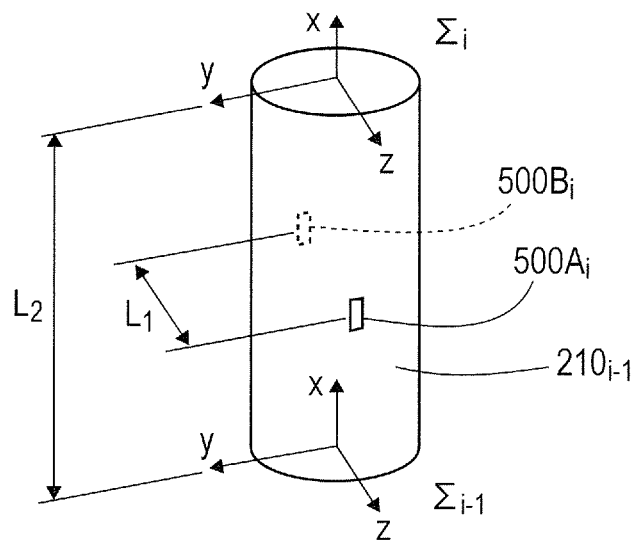
FIG. 13A is a schematic diagram of a link according to the third embodiment.
Figure 13B:
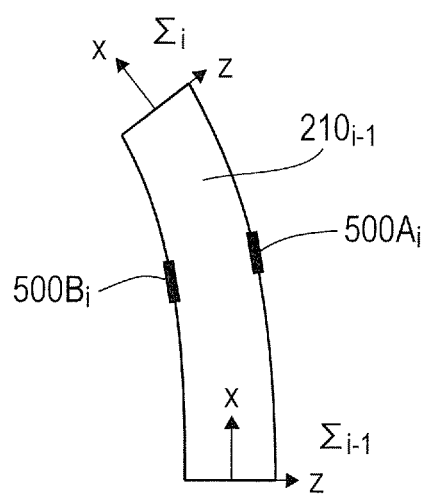
FIG. 13B is a schematic diagram illustrating the link deformed by temperature.

FIG. 13A is a schematic diagram of the link $210_{i-1}$ in the third embodiment of the present invention. FIG. 13B is a schematic diagram illustrating the link $210_{i-1}$ deformed by temperature. FIGS. 13A and 13B illustrate the link $210_{i-1}$ between the coordinates fixed to the joint $J_{i-1}$ and the coordinates $\Sigma_i$ fixed to the joint $J_i$. Two temperature sensors $500A_i$ and $500B_i$ are mounted on the link $210_{i-1}$. Values $ta_i$ and $tb_i$ denote rises in temperature (detection values) detected by the temperature sensors $500A_i$ and $500B_i$ relative to a normal temperature (for example, 25[° C.]). A distance between the two temperature sensors $500A_i$ and $500B_i$ is $L_1$, and a length of the link $210_{i-1}$, that is, a distance between the origin of the coordinates and the origin of the coordinates $\Sigma_i$, is $L_2$.

A linear thermal expansion coefficient of the link $210_{i-1}$ is $\alpha$, and an error in the coordinate transformation from the coordinates $\Sigma_{i-1}$ to the coordinates $\Sigma_i$ will be considered.

Extension in the vertical direction, that is, the X direction, due to the rise in the temperature can be calculated as follows from an average value of the two temperature sensors $500A_i$ and $500B_i$.

$$\frac{\alpha L_2(ta_i + tb_i)}{2} \tag{36}$$

An error in rotation around the Y axis can be calculated as follows.

$$\frac{\alpha L_2(ta_i - tb_i)}{L_1} \tag{37}$$

A parallel translation component in the Z axis direction can be calculated as follows.

$$-\frac{\alpha L_2^2(ta_i - tb_i)}{2L_1} \tag{38}$$

In step S46, the CPU 301 adds the effect of the rise in temperature calculated in step S45 to the fabrication error parameters of the robot 200 to calculate the error in position and orientation $r_i$ of the fixed end of the joint $J_i$.

Specifically, the temperatures $ta_i$ and $tb_i$ of the two temperature sensors $500A_i$ and $500B_i$ are used to calculate the error in position and orientation with six degrees of freedom as follows.

$$r_i \leftarrow \begin{bmatrix} r_{i,1} + \alpha L_2(ta_i + tb_i)/2 \\ r_{i,2} \\ r_{i,3} - \alpha L_2^2(ta_i - tb_i)/2L_1 \\ r_{i,4} \\ r_{i,5} + \alpha L_2(ta_i - tb_i)/L_1 \\ r_{i,6} \end{bmatrix} \tag{39}$$

An arrow denotes assignment, and $r_{i,j}$ denotes a $j$-th component of the fabrication error parameters of the robot 200 of the i-th joint $J_i$. For example, j=1 denotes a parallel translation component in the X direction. In this way, the error in position and orientation $r_i$ on the fixed side of the joint is calculated to calculate the coordinate transformation matrix $\Delta Tr_i$ of the error in position and orientation $r_i$.

In this manner, the CPU 301 corrects the fabrication error parameters according to the temperature of the robot 200 and calculates the error in position and orientation $r_i$ on the fixed side of the joint $J_i$ and the coordinate transformation matrix $\Delta Tr_i$ of the error in position and orientation $r_i$ in steps S45 and S46.

In this way, the temperature deformation of the link $210_{i-1}$ can be calculated from the temperature of the link $210_{i-1}$ (temperature detection results of the temperature sensors $500A_i$ and $500B_i$) in the third embodiment. Specifically, the linear thermal expansion coefficient, the length and the temperature of the link $210_{i-1}$ can be multiplied to calculate the extension caused by the temperature of the link $210_{i-1}$. Since the temperature of the link $210_{i-1}$ is detected by at least two temperature sensors $500A_i$ and $500B_i$, the bend of the link $210_{i-1}$ can be calculated. The temperature deformation can be added to the error in position and orientation $r_i$ of the joint to correct the error in position and orientation $r_j$.

According to the third embodiment, the error in position and orientation $r_i$ that occurs at the fixed end of the joint $J_i$ can be estimated and corrected based on the values of the temperature sensors $500A_i$ and $500B_i$ fixed to the robot 200. Therefore, highly accurate operation of the robot 200 can be realized even if there is a change in the temperature.

The correction of the errors caused by the temperature according to the third embodiment may not always be necessary in all of the joints. For example, the second joint $J_2$ close to the root is significantly affected by a change in the angle caused by thermal deformation. The effects can be expected even if only the second joint $J_2$ is corrected.

Fourth Embodiment

Figure 14:
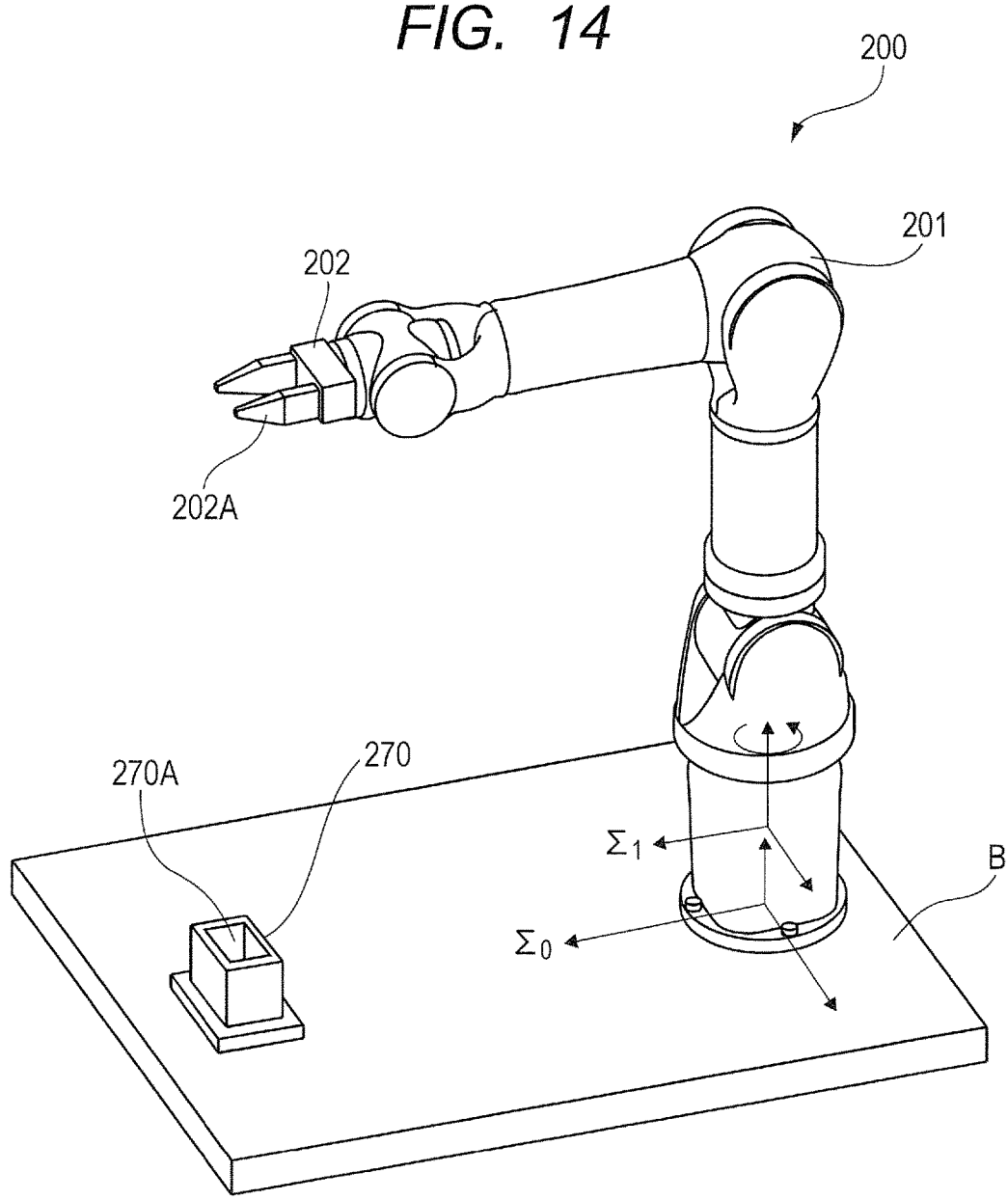
FIG. 14 is a perspective view illustrating a robot and surrounding members of the robot in a robot apparatus according to a fourth embodiment.

Next, a robot controlling method in a robot apparatus according to a fourth embodiment of the present invention will be described. FIG. 14 is a perspective view illustrating a robot and surrounding members of the robot in the robot apparatus according to the fourth embodiment of the present invention. In the fourth embodiment, the same components as in the first to third embodiments are designated with the same signs, and the description will not be repeated. The error in position and orientation of the joint is provided in advance in the simulation of the first embodiment. The fourth embodiment is different in that the robot 200 is actually operated to obtain (correct) the error in position and orientation $r_j$ of the joint. Here, j is 1 to 6. The different part will be mainly described.

In the 6-axis robot 200 illustrated in FIG. 14, the end point of the robot 200 is the robot hand 202. Nails 202A as a first fitting portion are formed on the robot hand 202. The robot 200 is fixed to the base B. A position mark member 270 as a fitting member provided with a fitting hole 270A as a second fitting portion is fixed to the base B. The position mark member 270 is arranged in an operation area of the robot 200.

In step S5 of FIG. 3, step S27 of FIG. 9 or step S46 of FIG. 12, the CPU 301 corrects the error in position and orientation $r_j$ when the CPU 301 uses the fabrication error parameters to obtain the error in position and orientation $r_j$. Specifically, the CPU 301 fits the nails 202A of the robot hand 202 to the fitting hole 270A of the position mark member 270 to obtain a correction value of the joint based on the deviation of the end point position of the robot 200 and stores the correction value in the storage unit (for example, HDD 304). In step S5 of FIG. 3, step S27 of FIG. 9 or step S46 of FIG. 12, the CPU 301 corrects the error in position and orientation $r_j$ based on the correction value read from the storage unit (for example, HDD 304).

Although the shape of the end point of the robot 200 (external form of the nails 202A of the robot hand 202 in the first embodiment) and the shape of the fitting hole 270A are shapes of part of a quadrangular pyramid, the shapes are not limited to these. For example, the shapes may be part of a cone, and the shapes may be arbitrary as long as positioning is possible.

Figure 15A:
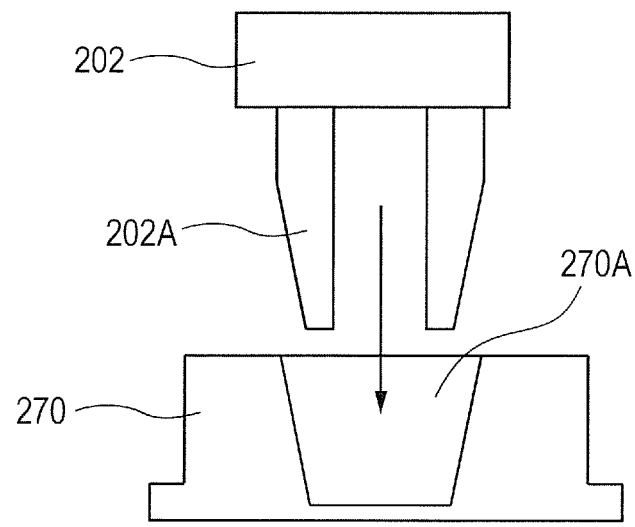
FIG. 15A is a schematic diagram illustrating a state before a robot hand is fitted to a position mark member.

FIG. 15A is a schematic diagram illustrating a state before the robot hand 202 is fitted to the position mark member 270.

Figure 15B:
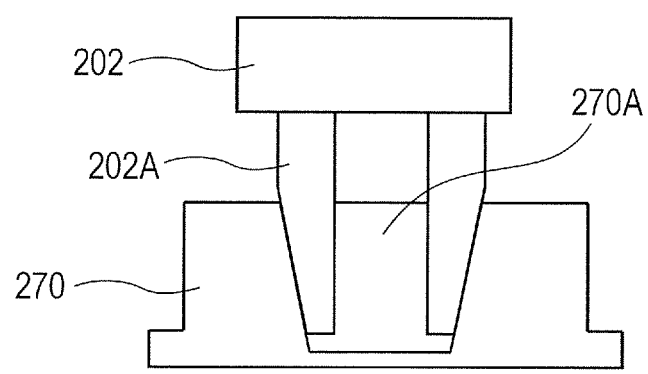
FIG. 15B is a schematic diagram illustrating a state in which the robot hand is fitted to the position mark member.

FIG. 15B is a schematic diagram illustrating a state in which the robot hand 202 is fitted to the position mark member 270.

As illustrated in FIGS. 15A and 15B, the joints of the robot 200 are operated to fit the nails 202A of the robot hand 202 to the fitting hole 270A of the position mark member 270. The fitting work is operation normally performed in assembly work in the robot 200. For example, a force sensor (not illustrated) mounted on the robot hand 202 can be used to perform impedance control in which fingers of the robot 200 move in reaction to external force, thereby pressing the nails 202A against the fitting hole 270A.

After the fitting, the CPU 301 calculates the position of the end point of the robot 200 based on the positions of the actuators 10 of the joints. The position of the end point of the robot 200 is different from the original target position due to various errors. The error in the position of the end point of the robot 200 is defined as $\Delta T_p$. A joint with an error is assumed next. For example, when the first joint is selected, a mount error of the first joint, that is, mount position and orientation of the robot 200, is estimated based on the error $\Delta T_p$. Specifically, it is assumed that the j-th joint is selected, and a mount error $\Delta T_{ppj}$ of the j-th joint is estimated from the following formula.

$$\Delta Tpp_j = ({}^0T_j^{-1}\,{}^0T_e)\Delta T_p({}^0T_j^{-1}\,{}^0T_e)^{-1} \quad (40)$$

This is a formula for coordinate transformation of the error $\Delta T_p$ of the end point position of the robot 200 expressed by the coordinates of the end point of the robot 200 into coordinates of the selected joint. This is added to the error in position and orientation $r_j$ of the j-th joint.

$$r_j \leftarrow r_j + \text{CoordTrans}^1(\Delta Tpp_j) \quad (41)$$

Here, an arrow denotes assignment.

According to the fourth embodiment, even if the mount position and orientation of the joint is not clear, the mount position and orientation can be estimated and corrected. In this way, more highly accurate operation of the robot is possible.

The present invention is not limited to the embodiments described above, and many modifications can be made within the technical scope of the present invention. The effects described in the embodiments of the present invention just illustrate most preferred effects derived from the present invention, and the effects of the present invention are not limited to the effects described in the embodiments of the present invention.

Other Embodiments

The present invention can also be realized by a process, in which a program for realizing one or more functions of the embodiments is supplied to a system or an apparatus through a network or a storage medium, and one or more processors in a computer of the system or the apparatus reads and executes the program. A circuit (for example, ASIC) that realizes one or more functions can also realize the present invention.

Although all of the joints in the robot are rotary joints in the description of the first to fourth embodiments, the arrangement is not limited to this, and part or all of the plurality of joints may be linear motion joints.

Although the vertical multi-joint robot is described in the first to fourth embodiments, the robot is not limited to this. For example, the present invention can be applied to various robots, such as a horizontal multi-joint robot, a parallel link robot and an orthogonal robot.

The robot apparatus may further include a camera as an imaging unit. In this case, the camera may take an image of the robot, and a controlling apparatus (CPU) may obtain the error in position and orientation of each joint based on the taken image obtained from the camera instead of using the joint deformation parameters and the fabrication error parameters to obtain the error in position and orientation of each joint.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-078716, filed Apr. 7, 2015, which is hereby incorporated by reference herein in its entirety.

What is claimed is:

1. A controlling method of a robot in which a controlling unit performs control for causing an actuator of each joint of a multi joint robot to operate according to each joint instruction value, the robot controlling method comprising:
    calculating, by the controlling unit, a joint error of each joint of the robot, for each of the joints;
    calculating, by the controlling unit, an error component in a driving direction of the actuator of the joint, for each of the joints;
    calculating, by the controlling unit, a residuals component excluding the error component in the driving direction of the actuator from the joint error of the joint, for each of the joints;
    calculating, by the controlling unit, an error in position and orientation of an end point of the robot based on the residuals component of each of the joints by forward mechanism calculation;
    calculating, by the controlling unit, a first correction quantity for correcting the joint instruction value using the error component in a driving direction of the actuator of the joint, for each of the joints;
    calculating, by the controlling unit, a second correction quantity for correcting the joint instruction value by using the error in position and orientation of the end point of the robot, for each of the joints by inverse mechanism calculation; and
    correcting, by the controlling unit, the joint instruction value by using the first correction quantity and the second correction quantity, for each of the joints.

2. The controlling method according to claim 1, wherein:
    the controlling unit includes a correcting mode of correcting the joint instruction value, a non-correcting mode of not correcting the joint instruction value, and a transition mode upon a switch from the non-correcting mode to the correcting mode, and
    in the correcting, the controlling unit multiplies at least one of the first correction quantity and the second correction quantity by a factor that monotonically increases from 0 to 1 with time in the transition mode, 0 in the non-correcting mode, and 1 in the correcting mode.

3. The controlling method according to claim 1, wherein:
    the controlling unit includes a correcting mode of correcting the joint instruction value, a non-correcting mode of not correcting the joint instruction value, and a transition mode upon a switch from the non-correcting mode to the correcting mode, and
    in the correcting, the controlling unit multiplies a total correction quantity that is a sum of the first correction quantity and the second correction quantity by a factor that monotonically increases from 0 to 1 with time in the transition mode, 0 in the non-correcting mode, and 1 in the correcting mode.

4. The controlling method according to claim 1, wherein:
    the controlling unit includes a correcting mode of correcting the joint instruction value, a non-correcting mode of not correcting the joint instruction value, and a transition mode upon a switch from the correcting mode to the non-correcting mode, and
    in the correcting, the controlling unit multiplies at least one of the first correction quantity and the second correction quantity by a factor that monotonically decreases from 1 to 0 with time in the transition mode, 0 in the non-correcting mode, and 1 in the correcting mode.

5. The controlling method according to claim 1, wherein:
    the controlling unit includes a correcting mode of correcting the joint instruction value, a non-correcting mode of not correcting the joint instruction value, and a transition mode upon a switch from the correcting mode to the non-correcting mode, and
    in the correcting, the controlling unit multiplies a total correction quantity that is a sum of the first correction quantity and the second correction quantity by a factor that monotonically decreases from 1 to 0 with time in the transition mode, 0 in the non-correcting mode, and 1 in the correcting mode.

6. The controlling method according to claim 1, wherein, in the calculating the joint error of each joint, the controlling unit obtains a first joint error of each of the joints caused by deformation of each of the joints and a second joint error of each of the joints caused by a fabrication error of the robot.

7. The controlling method according to claim 6, wherein:
    parameters of the fabrication error are stored in a storage unit, and
    in the calculating the error in position and orientation of each joint, the controlling unit reads the parameters of the fabrication error from the storage unit when the controlling unit obtains the second joint error.

8. The controlling method according to claim 7, wherein, in the calculating the error in position and orientation of each joint, the controlling unit corrects the parameters of the fabrication error according to temperature of the robot.

9. The controlling method according to claim 6, wherein:
a fitting member for fitting the end point of the robot is arranged in an operation area of the robot, and
the controlling unit corrects the second error based on an actual position and orientation relative to a target position and orientation of the end point of the robot when the end point of the robot is fitted to the fitting member.

10. A robot apparatus comprising:
a multi-joint robot; and
a controlling unit configured to control the multi-joint robot,
wherein:
the controlling unit performs a control for causing an actuator of each joint of the multi-joint robot to operate according to each joint instruction value,
the controlling unit calculates a joint error of each joint of the robot, for each of the joints,
the controlling unit calculates an error component in a driving direction of the actuator of the joint, for each of the joints,
the controlling unit calculates a residuals component excluding the error component in the driving direction of the actuator from the joint error of the joint, for each of the joints,
the controlling unit calculates an error in position and orientation of an end point of the robot based on the residuals component of each of the joints by forward mechanism calculation,
the controlling unit calculates a first correction quantity for correcting the joint instruction value by using the error component in a driving direction of the actuator of the joint, for each of the joints;
the controlling unit calculates a second correction quantity for correcting the joint instruction value by using an error in position and orientation of the end point of the robot, for each of the joints by inverse mechanism calculation, and
the controlling unit corrects the joint instruction value by using the first correction quantity and the second correction quantity, for each of the joints.

11. A non-transitory computer-readable recording medium storing a program for operating a computer to execute a robot controlling method in which a controlling unit performs control for causing an actuator of each joint of a multi-joint robot to operate according to each joint instruction value, the program comprising:
code for calculating, by the controlling unit, a joint error of each joint of the robot, for each of the joints;
code for calculating, by the controlling unit, an error component in a driving direction of the actuator of the joint, for each of the joints;
code for calculating, by the controlling unit, a residuals component excluding the error component in the driving direction of the actuator from the error of the joint, for each of the joints;
code for calculating, by the controlling unit, an error in position and orientation of an end point of the robot based on the residuals component of each of the joints by forward mechanism calculation;
code for calculating, by the controlling unit, a first correction quantity for correcting the joint instruction value by using the error component in a driving direction of the actuator of the joint, for each of the joints;
code for calculating, by the controlling unit, a second correction quantity for correcting the joint instruction value by using the error in position and orientation of the end point of the robot, for each of the joints by inverse mechanism calculation; and
code for correcting, by the controlling unit, the joint instruction value by using the first correction quantity and the second correction quantity, for each of the joints.

* * * * *